(12) United States Patent
Xia et al.

(10) Patent No.: US 10,528,563 B2
(45) Date of Patent: Jan. 7, 2020

(54) PREDICTIVE TABLE PRE-JOINS IN LARGE SCALE DATA MANAGEMENT SYSTEM USING GRAPH COMMUNITY DETECTION

(71) Applicant: Futurewei Technologies, Inc., Plano, TX (US)

(72) Inventors: Yinglong Xia, Santa Clara, CA (US); Ting Yu Leung, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 279 days.

(21) Appl. No.: 15/470,813

(22) Filed: Mar. 27, 2017

(65) Prior Publication Data

US 2018/0173763 A1    Jun. 21, 2018

Related U.S. Application Data

(60) Provisional application No. 62/435,606, filed on Dec. 16, 2016.

(51) Int. Cl.
*G06F 16/00* (2019.01)
*G06F 16/2453* (2019.01)
(Continued)

(52) U.S. Cl.
CPC .. *G06F 16/24544* (2019.01); *G06F 16/24554* (2019.01); *G06F 16/9024* (2019.01); *G06F 16/9038* (2019.01)

(58) Field of Classification Search
CPC .......... G06F 16/24544; G06F 16/9038; G06F 16/24554; G06F 16/9024
See application file for complete search history.

(56) References Cited

U.S. PATENT DOCUMENTS

| 5,671,403 A | 9/1997 | Shekita et al. |
| 5,758,335 A | 5/1998 | Gray |

(Continued)

FOREIGN PATENT DOCUMENTS

| CN | 102722546 A | 10/2012 |
| CN | 103065028 A | 4/2013 |
| JP | 2004272369 A | 9/2004 |

OTHER PUBLICATIONS

PCT/CN2017/114654, ISR, dated Mar. 9, 2018.

(Continued)

*Primary Examiner* — Noosha Arjomandi
(74) *Attorney, Agent, or Firm* — Vierra Magen Marcus LLP

(57) ABSTRACT

A computer-implemented method for identifying pre-join operations, when accessing a database of relational tables, based on a usage history and/or a priority needs, comprises creating a graph of weighted edges and nodes, the nodes represent relational tables and edges represent join operations to be performed on the tables, partitioning the graph into a plurality of graph communities based on graph community densities, with a density indicating a number of edges touching a particular node, with the number of edges being greater than a predetermined edge number threshold, with each edge further including an edge weight indicative of a frequency of referencing within a predetermined recent duration of time and/or indicative of urgency of quick access to the corresponding join result within a predetermined recent duration of time, and generating pre-join results based on the partitioned graph communities and graph community densities.

16 Claims, 10 Drawing Sheets

(51) Int. Cl.
*G06F 16/901* (2019.01)
*G06F 16/9038* (2019.01)
*G06F 16/2455* (2019.01)

(56) References Cited

U.S. PATENT DOCUMENTS

| | | | | |
|---|---|---|---|---|
| 6,970,882 | B2* | 11/2005 | Yao | G06F 16/30 |
| 9,213,990 | B2* | 12/2015 | Adjaoute | G06Q 20/4016 |
| 9,640,376 | B1* | 5/2017 | Becker | H01J 49/0036 |
| 10,375,160 | B2* | 8/2019 | Li | G06F 9/5072 |
| 2005/0102292 | A1 | 5/2005 | Tamayo et al. | |
| 2013/0231862 | A1 | 9/2013 | Delling et al. | |
| 2014/0280023 | A1 | 9/2014 | Jagtap et al. | |
| 2015/0261861 | A1* | 9/2015 | Li | G06F 16/951 |
| | | | | 707/755 |
| 2015/0286684 | A1* | 10/2015 | Heinz | G06F 16/24549 |
| | | | | 707/769 |
| 2015/0295812 | A1 | 10/2015 | Liu et al. | |
| 2016/0012152 | A1* | 1/2016 | Johnson | G06F 16/9024 |
| | | | | 707/798 |
| 2016/0055205 | A1* | 2/2016 | Jonathan | G06F 16/24537 |
| | | | | 707/714 |
| 2016/0117414 | A1 | 4/2016 | Verma | |
| 2016/0253402 | A1 | 9/2016 | Klots et al. | |
| 2016/0267397 | A1* | 9/2016 | Carlsson | G06N 5/025 |
| 2016/0352767 | A1* | 12/2016 | Owhadi | G06F 17/18 |
| 2017/0116315 | A1* | 4/2017 | Xiong | G06F 16/285 |
| 2017/0185655 | A1* | 6/2017 | Jahankhani | G06F 16/2455 |
| 2017/0206034 | A1* | 7/2017 | Fetik | G06F 3/0653 |
| 2017/0213257 | A1* | 7/2017 | Murugesan | G06Q 30/0275 |
| 2017/0221240 | A1* | 8/2017 | Stetson | G06T 11/206 |
| 2017/0262781 | A1* | 9/2017 | Yang | G06Q 10/06393 |
| 2018/0047192 | A1* | 2/2018 | Kristal | G06T 11/60 |

OTHER PUBLICATIONS

U.S. Appl. No. 15/470,830, filed Mar. 27, 2017.
Office Action dated Jun. 19, 2019, in U.S. Appl. No. 15/470,830, 23 pages.
European Search Report dated Oct. 24, 2019, in European Patent Application No. EP17880685, 8 pages.
Office Action dated Oct. 7, 2019, in U.S. Appl. No. 15/470,830.

* cited by examiner

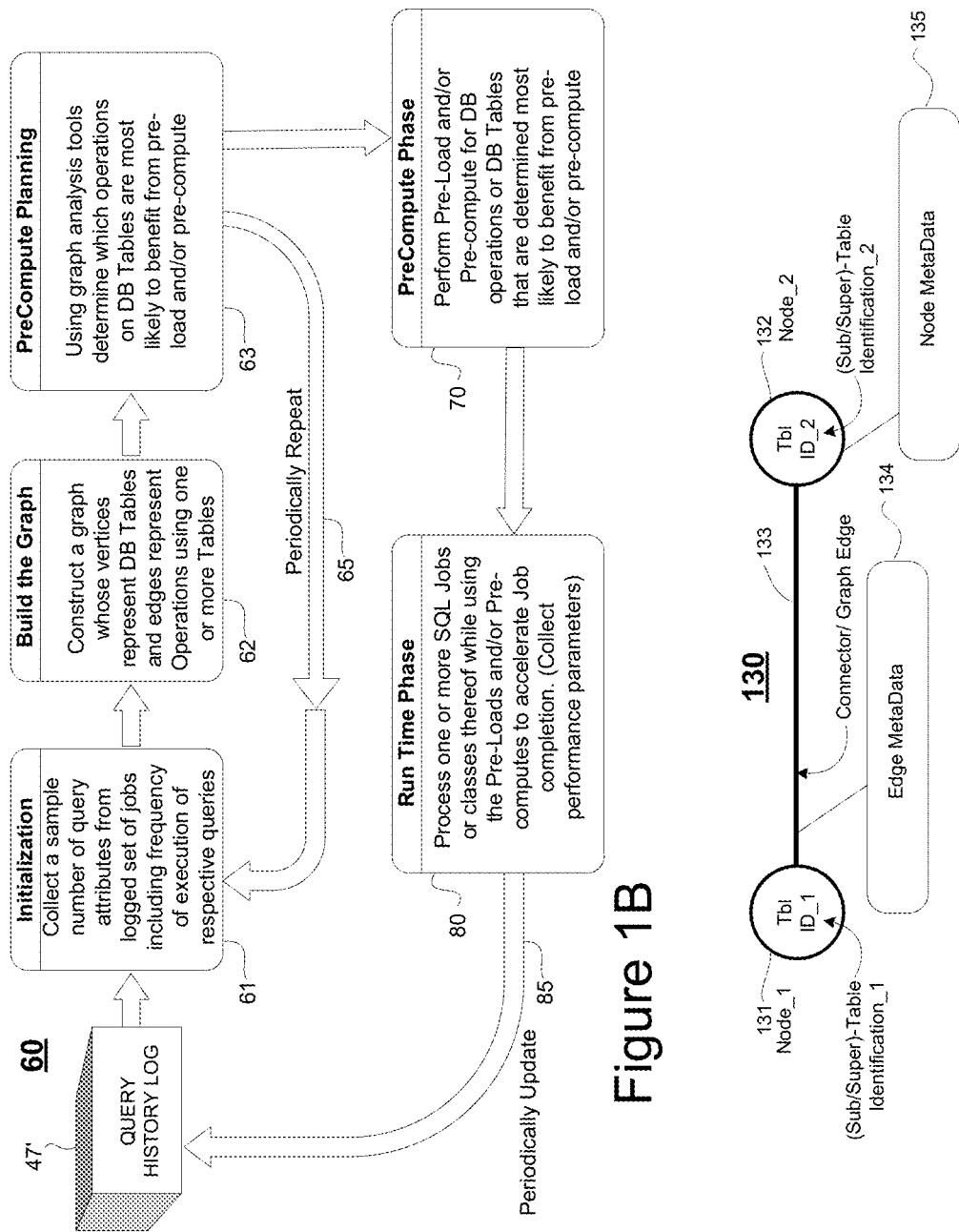

PREDICTIVE TABLE PRE-JOINS IN LARGE SCALE DATA MANAGEMENT SYSTEM USING GRAPH COMMUNITY DETECTION

CROSS REFERENCE

U.S. provisional patent application 62/435,606 entitled "Predictive Table Pre-Joins in Large Scale Data Management System Using Graph Community Detection", filed Dec. 16, 2016 on behalf of inventors Yinglong Xia and Ting Yu Leung, is incorporated herein by reference in its entirety.

BACKGROUND

Large scale data mining, which is sometimes referred to as 'Big Data' typically calls for real time maintenance of massive, enterprise level databases and use of numerous data analysis programs to extract currently meaningful information from the databases. The enterprise level databases typically store large numbers of relational tables that provide basic relational attributes for system tracked data objects (e.g., customers, products, employees, sales transactions, etc.). Data mining often calls for identification of complex correlations between system tracked data objects (e.g., which employees satisfactorily serviced which customers in a select class of sales transactions?).

These kinds of analyses typically call for selective joining of data from multiple database tables. Emerging challenges in this area include quickening the rate at which Big Data mining results are produced despite the growing sizes of the massive databases and making efficient use of finite data processing resources. One method of achieving these goals is to rely on pre-computing wherein certain computational operations that are likely to be required when the data analysis programs execute are carried out before program execution so that the results are immediately available for use by currently executing programs. One form of pre-computing is known as a pre-join operation. Here, tables that are to be selectively joined together inside an analysis program are joined together ahead of time.

Traditional database pre-join techniques exhibit poor performance when the number of tables increases significantly. An improved method and system are disclosed here.

SUMMARY

A computer-implemented method for identifying a set of pre-join operations to be performed, when accessing a database of relational tables, based on a usage history and/or a priority needs, includes creating a graph of weighted edges and nodes, where the nodes represent relational tables and the edges represent join operations to be performed on the tables, partitioning the graph into a plurality of graph communities based on corresponding graph community densities, with a density of the graph community densities indicating a number of edges touching a particular node, with the number of edges being greater than a predetermined edge number threshold, with each edge further including an edge weight indicative of a frequency of referencing within a predetermined recent duration of time and/or indicative of urgency of quick access to the corresponding join result within a predetermined recent duration of time, and generating pre-join results based on the partitioned graph communities and graph community densities.

In some method embodiments, edge weights are based on edge metadata associated with the edges, the edge metadata indicating at least one of a join type, join dynamics, probability of the join being referenced, geometry of the join, direction of the join, frequency of reference to the join results, historical trends in frequency of reference to the join results, or urgency priority for having the join results substantially immediately available.

In some method embodiments, the edge metadata provides a unique identification for the corresponding edge and/or a represented set of join operations.

In some method embodiments, the edge metadata identify tables joined by the respective edge.

In some method embodiments, the nodes are associated with node metadata, the node metadata indicating at least one of a unique node identification, an identification of a table represented by the node, an identification of a table type, an indication of a table size, an indication of maximal extents in different aspect dimensions of axes of the table, an indication of how persistent the table needs to be within memory, or an indication of a desired access speed for accessing the table.

In some method embodiments, the graph is filtered to leave a specific one or more of different join types before performing the graph community detection process.

In some method embodiments, the generating of the pre-join results includes ordering detected graph communities according to graph community densities, where the graph community densities are indicative of collective frequency of referencing to members of the graph community and/or indicative of collective urgency of access to the members of the graph community, and identifying a densest node within one of the ordered graph communities.

In some method embodiments, the generating of the pre-join results further includes sequencing from a first ordered graph community to a next ordered graph community based on said ordering.

In some method embodiments, the generating of the pre-join results further includes determining if a pre-join result will be larger than a predetermined table size threshold, and if the pre-join result will be larger than the predetermined table size threshold, designating a corresponding pre-join candidate for partitioning.

A database device includes a memory storage comprising instructions, and one or more processors in communication with the memory, wherein the one or more processors execute the instructions to create a graph of weighted edges and nodes, where the nodes represent relational tables and the edges represent join operations to be performed on the tables, partition the graph into a plurality of graph communities based on corresponding graph community densities, with a density of the graph community densities indicating a number of edges touching a particular node, with the number of edges being greater than a predetermined edge number threshold, with each edge further including an edge weight indicative of a frequency of referencing within a predetermined recent duration of time and/or indicative of urgency of quick access to the corresponding join result within a predetermined recent duration of time, and generate pre-join results based on the partitioned graph communities and graph community densities.

In some database device embodiments, edge weights are based on edge metadata associated with the edges, the edge metadata indicating at least one of a join type, join dynamics, probability of the join being referenced, geometry of the join, direction of the join, frequency of reference to the join results, historical trends in frequency of reference to the join results, or urgency priority for having the join results substantially immediately available.

In some database device embodiments, the edge metadata provides a unique identification for the corresponding edge and/or a represented set of join operations.

In some database device embodiments, the edge metadata identify tables joined by the respective edge.

In some database device embodiments, the nodes are associated with node metadata, the node metadata indicating at least one of a unique node identification, an identification of a table represented by the node, an identification of a table type, an indication of the table size, an indication of maximal extents in different aspect dimensions of axes of the table, an indication of how persistent the table needs to be within memory, or an indication of a desired access speed for accessing the table.

In some database device embodiments, the graph is filtered to leave a specific one or more of different join types before performing the graph community detection process.

In some database device embodiments, the generating of the pre-join results includes ordering detected graph communities according to graph community densities, where the graph community densities are indicative of collective frequency of referencing to members of the graph community and/or indicative of collective urgency of access to the members of the graph community, and identifying a densest node within one of the ordered graph communities.

In some database device embodiments, the generating of the pre-join results further includes sequencing from a first ordered graph community to a next ordered graph community based on said ordering.

In some database device embodiments, the generating of the pre-join results further includes determining if a pre-join result will be larger than a predetermined table size threshold, and if the pre join result will be larger than the predetermined table size threshold, designating a corresponding pre-join candidate for partitioning.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a schematic diagram depicting a method based on graph analysis for planning and performing at least one of pre-loading and pre-computing operations.

FIG. 1D is a schematic diagram depicting an elementary graph having two nodes linked to one another by a connector branch.

DETAILED DESCRIPTION

Figure 1A:
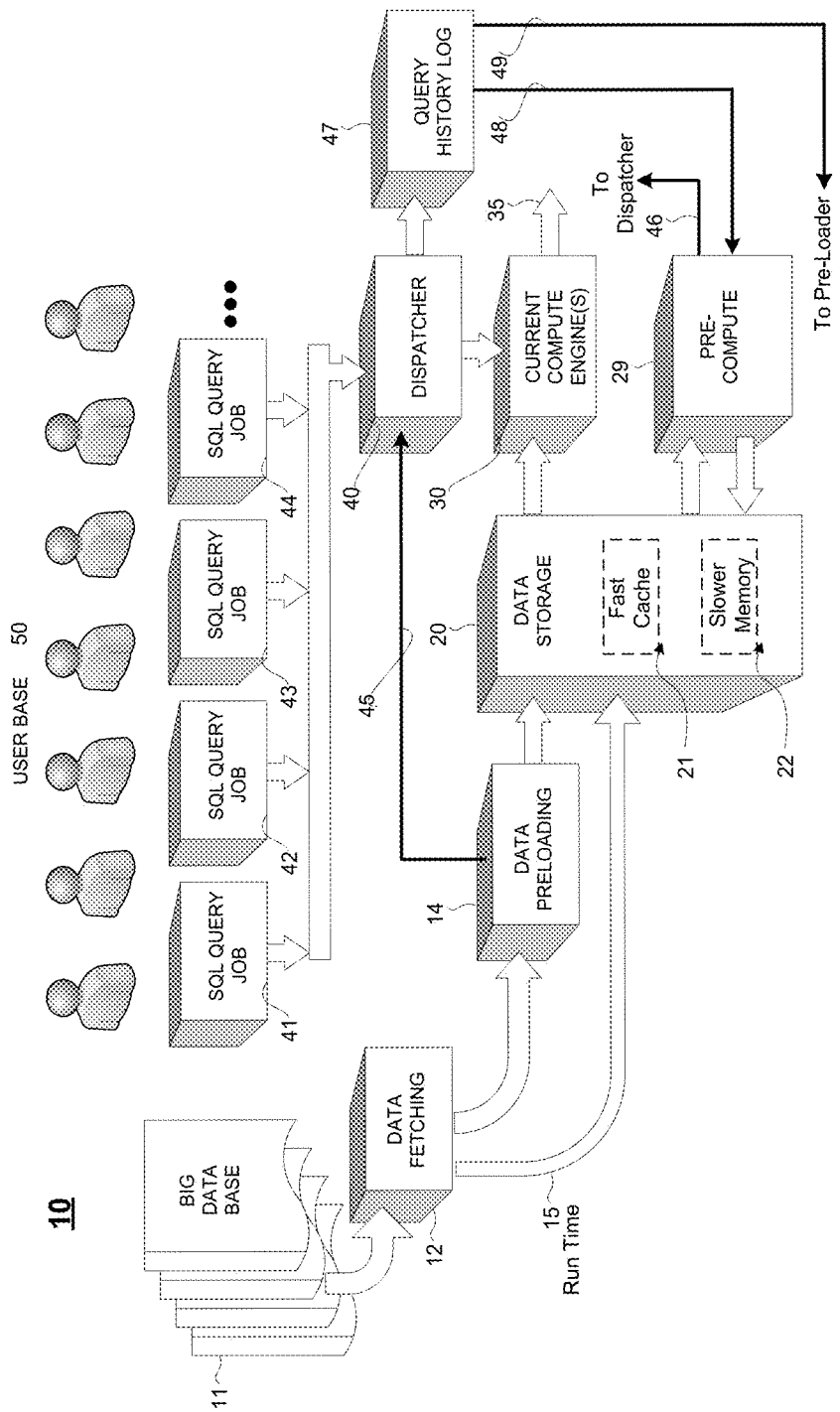
FIG. 1A is a block diagram of a queries processing system including at least one of a pre-loading and pre-computing capability.

A periodically repeated or otherwise event-triggered graph community detection process is carried out herein on an automatically repeatedly updated graph of tables and on table referencing operations that link to a respective one or more of the tables. Density and/or urgency of table referencing operations can indicate which tables should be considered as most "important" (highly weighted) and therefore preferably placed in higher speed storage. Likewise, density and/or urgency of table referencing operations can indicate which tables should be considered as moderately "important" (less highly weighted) and therefore preferably placed in storage having lower access speed (which slower storage generally also has lower cost), and can indicate which tables should be considered as least "important" (lowest weighted) and therefore preferably not placed in storage reserved for preloaded pre-compute and/or pre-stored results.

The process is not as simple as determining importance for each table alone or based on referencing operations to each such table taken in isolation. Some table referencing operations benefit only if certain multiple tables simultaneously reside in a substantially same speed class of pre-storage. Otherwise, there is no point to having fast access to one (but not the others) of such simultaneously to-be-accessible-at-same speed tables. One example of need for simultaneous access is where tables are to be participants in an aggregation operation such as a join operation.

In one embodiment, a graph is repeatedly constructed or updated to represent each table that participates in one or more join instructions (or join executions). A node or vertex of the graph represents a table and each join is represented as a connector or graph edge that connects tables. The connector branch/graph edge can include a usage density or weight recorded as part of edge metadata. Density as used herein comprises a number of operations (such as join operations) to be performed per table, and comprises the number of edges (inter-graph operations) touching a node (i.e., a table in a graph representation).

As the graph is built, highest density nodes/edges and/or highest density graph communities can be detected. Further, the graph nodes can be partitioned according to node/edge density values, or according to node/edge density ranges. A community can comprise nodes having a common density value or having density values within a predetermined density range, for example. The node densities (i.e., the number of edges touching a particular node) of the detected communities can be indicative of how likely in the near future a join or other table creation operation is to be instructed or executed. A sorted table of pre-joins can be generated by performing community detection on a graph in a hierarchical way, to achieve pre-joined tables of reasonable sizes stored into respective caches. Joins in the densest communities are designated for highest priority pre-joins while joins in less dense communities are designated for lower priority pre-joins. By performing and storing pre-joins according to community detection, efficient usage of system resources can be obtained. A sorted table of pre joins can be generated by performing community detection on a graph in a hierarchical way, to achieve pre joined tables of reasonable sizes stored into respective caches.

Concomitant with identifying pre-joins that are best suited for performing during pre-compute time, it is also advantageous to determine, during pre-compute time, where such pre-joins (and otherwise created tables e.g., pre-truncates) are to be pre-stored (pre-loaded) within a hierarchy of fastest to slowest storage. Here again, a graph community detection process can be carried out on an automatically repeated basis, but with different goals, using importance weights for determining why some pre-joins or other tables are to be accessed on a faster basis than others (e.g., due to urgency and/or frequency and/or concomitance of usage with other important tables).

FIG. 1A is a block diagram of a queries processing system 10 including at least one of a pre-loading capability 14 and a pre-computing capability 29. Ideally, each of the pre-loading (14) and pre-computing (29) operations should provide a current compute operation (30) with corresponding pre-load and/or pre-compute results on an efficient, just-in-time basis so that the through-put of the current compute operation is maximally increased and portions of data storage 20 allocated for storing pre-load and/or pre-compute results are not wasted storing large amounts of data that are not soon to prove useful for the current compute operation (30). Additionally, the data processing resources of the pre-loading capability 14 and of the pre-computing capability 29 should not be wasted on generating large amounts of data that are not soon to prove useful for the current compute operation (30).

A problem in the field of pre-loading and pre-computing is how to determine which pre-load and/or pre-compute results are most likely to be most beneficial to those of potential current compute operations that are most likely to soon execute in the queries processing system 10. This is not a trivial problem in large scale systems that have many users 50 and large numbers of query jobs (e.g., 41-44, etc.) to run within predetermined time slots.

Further aspects of FIG. 1A are described here for sake of a more complete understanding. Large scale data mining or 'Big Data' for short, typically calls for real time maintenance of massive, enterprise level databases collectively illustrated in FIG. 1A as a Big Data Base 11. This massive amount of Big Data 11 might be measured in terabytes or petabytes and is generally too large to be stored in a single storage unit that can provide reasonably fast access to any random part of it. Accordingly, selective fetching and moving (12) of needed data from the Big Data Base 11 to a relatively localized storage subsystem 20 must be performed. This selective fetching and moving (12) can be performed at run time (15) in real-time response to data requests made by currently executing query jobs (e.g., 41-44, etc.) or it could be carried out on a predictive basis even before the currently executing query jobs ask for the data. The latter predictive and selective fetching and moving of not-yet-known-to be-needed data is automatically performed by the data pre-loading unit 14. Thereafter, when a currently executing query job asks for the data, it is found to already be present in local storage 20 and time is not wasted sending a selective fetch request to the data fetching unit 12 and waiting for the requested data to be found in the Big Data Base 11 and moved during run time (15) into the local storage 20.

A subsidiary aspect of pre-loading (14) is that of determining where in local storage 20 the pre-loaded data should be stored. For sake of simplicity, the exemplary local storage subsystem 20 is shown subdivided into a fast cache portion 21 and a slower memory portion 22. It is within the contemplation of the present disclosure to subdivide a local storage subsystem into many more portions having not only different read or write speed attributes but also other different attributes such as for nonvolatility, longevity, reliability, security and so forth. The illustrated subdivision is merely for sake of a simple example.

Similar to how it may be advantageous to selectively pre-load (14) certain items of data, it may be advantageous to compute ahead of time certain data processing results even before it is known that such data processing results will actually be needed. If the system pre-compute unit 20 predicts with relatively good accuracy what data processing results the currently executing query jobs (e.g., 41-44, etc.) will likely soon need to generate, then the pre-compute unit 20 can generate those results ahead of time, store them in the local storage 20 and thereafter, when one or more of the currently executing query jobs (e.g., 41-44, etc.) discovers that it needs those results, the query job can first check a pre-computes directory (not shown) to see if the needed results have been pre-computed. If yes, time and resources need not be consumed computing those results again and again. A subsidiary aspect of pre-computing (29) is that of determining where in local storage 20 the pre-computed data should be stored. Once again for sake of simplicity, the choice might be that of deciding between the local fast cache portion 21 and the slower memory portion 22.

In accordance with the present disclosure, a job dispatcher 40 is operatively coupled to one or more run-time compute engines 30. The dispatcher 40 when and which SQL query jobs (e.g., 41-44, etc.) should be dispatched for current execution by a respective one or more run-time compute engines 30. The dispatcher 40 may make its decisions based on a variety of factors including, but not limited to, how big each job is, what resources (e.g., free run-time compute engines in 30, free memory space in 20) are currently available for servicing that job, and the urgency of getting the job done (e.g., as indicated by priority weights—not shown). Optionally, the dispatcher 40 may make its decisions based on one or both of respective indications 45 and 46 respectively from the pre-loading unit 14 and the pre-compute unit 29 as to what pre-loads and/or pre-computes are currently loaded into the local data storage resources 20 for accelerating the completion time of each candidate job or for accelerating the completion time of a class of jobs to which a current candidate job (e.g., 41-44, etc.) belongs. Thus the speed with which each submitted query job (e.g., 41-44, etc.) gets completed (as finished output 35) may depend on how well one or both of the pre-loading unit 14 and the pre-compute unit 29 accurately predict which pre-loads and/or pre-computes should be placed into the local data storage resources 20 and when.

In one embodiment, the job dispatcher 40 is operatively coupled to a query history logging unit 47. The logging unit 47 respectively provides feedback information streams 48 and 49 respectively to the pre-compute unit 29 and the pre-loading unit 14 for informing the latter of what query jobs (e.g., 41-44, etc.) or classes thereof were recently submitted (e.g., within the past hour, day, week, etc.) and with what respective frequencies (e.g., per hour, per day, per week, etc.) and/or respective urgencies (e.g., high, medium, low) as well as optionally indicating trends and what errors or slowdowns were encountered as a result of missing pre-loads and/or missing pre-computes. The pre-compute unit 29 and the pre-loading unit 14 can then adaptively learn from this feedback information (48 and 49) so as to perform better in view of changing needs of the user population 50.

Referring to FIG. 1B, shown is a schematic diagram depicting a method 60 based on graph analysis for planning and performing at least one of pre-loading and pre-computing operations. In an initialization step 61, the method obtains recent performance data from the query history logging unit 47'. The obtained data may be that for a predetermined set of query jobs or a predetermined one or more classes of query jobs (e.g., those dedicated to servicing specific needs of specific enterprise departments—see briefly 151-155 of FIG. 1C). In one embodiment, the obtained data includes at least one of recent frequency of execution of the query jobs in the predetermined set or predetermined one or more classes of the query jobs and recent urgencies (e.g., priorities) of the query jobs. The obtained data may alternatively or additionally include trending data indicating recent rates of increase or decrease in frequency of execution of the query jobs or in urgencies of the query jobs.

In step 62, a multiline modeling graph is automatically built based on the obtained recent performance data. The constructed graph includes vertices (or nodes) respectively representing database (DB) tables and lines (or edges, branches or connectors) respectively representing operations performed on line-touched ones of the represented DB tables.

In step 63, graph structure analysis tools are used to automatically determine which operations on which DB tables are most likely to occur in the near future (e.g., within the current hour, day, week etc.) such that execution of corresponding query jobs in the near future are more likely than not to benefit (e.g., in terms of completion speed) from pre-loading of the involved DB tables and/or pre-computing of the represented operations. The graph structure analysis tools may include those that identify dense clusters (dense graph communities) of nodes and branches (a.k.a. vertices and graph edges).

In step 70, the corresponding pre-loads and/or pre-computes of the represented tables and operations, as identified by the graph structure analysis tools to be more likely to benefit are carried out. In one embodiment, a benefit metric is devised and the pre-run-time operations (pre-loads and/or pre-computes) that provide the most benefit are carried out first.

In step 80 (run time phase), corresponding query jobs or classes of query jobs that are deemed to be more urgent and/or most likely to benefit from available results of carried out pre-loads and/or pre-computes are executed. At substantially the same time, performance metrics of the executed jobs are collected and used to periodically update (85) the queries history log kept in unit 47'. Then, after one or more updates (85) of the queries history log have been made, a repeat 65 of steps 61, 62 and 63 is carried out so as to create an updated modeling graph and a correspondingly updated set of pre-load and pre-compute plans. In this way, the system adapts to changing conditions.

Figure 1C:
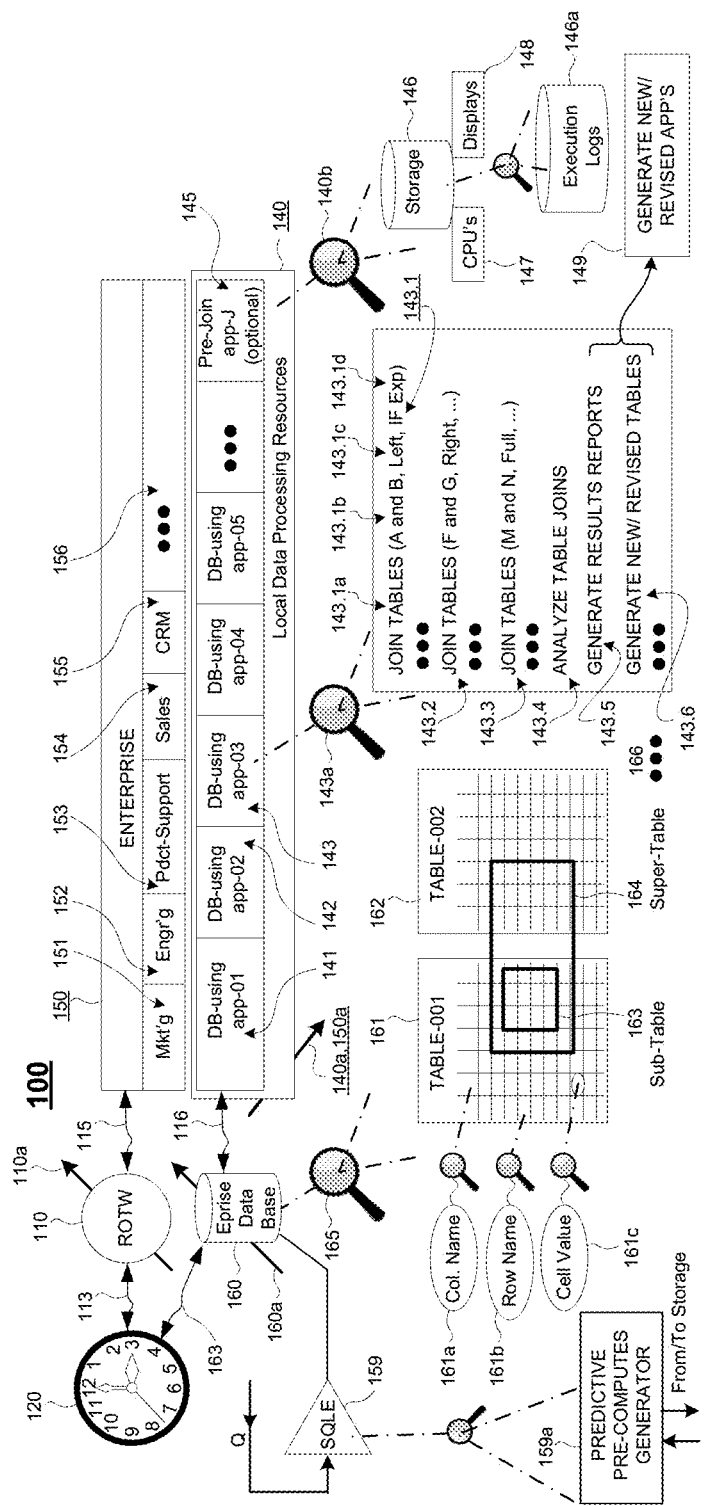
FIG. 1C is a schematic diagram depicting a given enterprise within a world environment and usages of database tables by data mining applications of the enterprise.

A more detailed explanation is provided with reference to FIG. 1C where the latter is a schematic diagram depicting a real world environment 100 including a given enterprise 150 that makes use of accessible (fetchable) database tables such as 161 and 162 that are stored in an enterprise accessible database 160. Use of the tables can include analysis of data stored in those tables (e.g., 161, 162) during execution of enterprise-accessible data mining applications such as illustrated at 141, 142 and via magnification 143a of application program 143. The various data mining applications may utilize table aggregation operations (e.g., table join operations such as at 143.1) to generate respective analysis reports (such as those of step 143.5) relevant to current world and current enterprise situations. Various activity units (e.g., 151, 152, etc.) of the enterprise 150 may make use of these generated reports including that of timely reacting to real world events inside the enterprise 150 and/or in the rest of the world (ROTW) 110. Due to the rapid rate at which events can unfold, it can be highly useful to obtain real time analysis reports (143.5) as soon as possible (ASAP), meaning that the database-using applications should perform their operations as quickly as possible.

More specifically, as real world effective time and events rapidly unfold (represented by clock symbol 120), current situational conditions within the enterprise 150 and within the rest of the world (ROTW) 110 can change both interdependently and independently of one another at commensurate rates. Double arrow headed symbol 115 represents interdependent interactions between events inside the enterprise 150 and those of the ROTW 110. Double arrow headed symbol 113 represents predicted event unfoldings (modeled future events) of the ROTW 110 including, for one embodiment, predicted futuristic market conditions and sales projections. A first angled through-arrow 110a in the diagram that extends through ROTW symbol 110 represents over-time variability of external world conditions. A second angled through-arrow 140a-150a that extends through block 140 represents over-time variability of enterprise internal conditions including those of enterprise activity units (e.g., 151-156) and those of enterprise controlled data processing resources 140. A third angled through-arrow 160a represents over-time variability of enterprise accessible database resources 160.

One point being made in the above with reference to the various through-arrows (100a, 140a-150a, 160a) is that everything is constantly changing and thus accommodations should be made for the continuously evolving enterprise-internal and external conditions. By way of example, if the exemplary enterprise 150 is a business enterprise selling specific goods and/or services to a given one or more market segments then that enterprise 150 should be keeping track of demographic and other changes (both current and predicted) within its target customer population and also keeping track of competitive forces (both current and predicted) exerted by competing other enterprises (not referenced but understood to exist within ROTW bubble 110, with at least some of the competitors using database analysis to further their competitive stances). To that end, the given business enterprise 150 may rely on both general purpose and proprietary data mining applications (e.g., 141-143) for repeatedly sifting through the enterprise-accessible, big data database 160 (can be more than one database) while using local or remotely accessible data processing resources 140 of the enterprise to perform automated analysis. It is to be noted that enterprise accessibility to the one or more databases 160 is schematically represented by double-headed arrow symbol 116 in FIG. 1C. Yet another double-headed arrow symbol 163 in the diagram represents predictive models maintained within the big database 160 or within other enterprise-accessible storage (e.g., 146) for predicting likely world outcomes for the enterprise 150 and for the ROTW 110 based on currently available information and current analysis of that information (e.g., that provided by the analysis programs 141, 142, etc.).

In one exemplary embodiment, the illustrated business enterprise 150 includes: (a) a marketing unit or department 151 that is responsible for predicting future market demands and price affordabilities of target customer populations; (b) an engineering unit 152 responsible for designing goods and/or services for serving current and predicted market needs; (c) a product support unit 153 responsible for supporting current products and/or services offered by the enterprise; (d) a sales unit 154 responsible for making offers and sales to the customer population; (e) a customer relations management unit 155 responsible for tracking and forming desired relationships with current and prospective customers and yet further such business units or departments where the latter are represented by ellipses 156.

Each of the operational units (e.g., 151-156) of the enterprise 150 may make use of one or more database-using application programs (e.g., DB-using apps 141-143, . . . ). The programs themselves (e.g., 143) may each make use of one or more table access and aggregation operations. More specifically and referring to the magnified look 143a at some of the executable instructions inside application 143, it may be seen that a subset of these instructions can call for a number of table join operations such as represented at 143.1, 143.2 and 143.3. Yet more specifically, a first of the illustrated table join instructions, 143.1 includes an SQL join command 143.1a whose parameters include: an identification 143.1b of the tables that are possibly to be joined (e.g., tables A and B); an identification 143.1c of the type (e.g., Left) of join operation to be performed and a conditions expression 143.1d which latter expression can include one or more contingencies (e.g., IF X is true and Y is false) that are to be satisfied before the specified type of join operation is commenced. In terms of yet more detail, the database-using application programs (e.g., DB-using apps 141-143, . . . ) will typically not perform the conditional table joins or other query tasks themselves but will instead delegate the query task (Q) to a database query drive engine (SQLE) such as shown at 159. The database query drive engine may include task optimization features such as that of checking a pre-join directory to determine if a requested join operation has already been performed and the desired results stored. In that latter case, the SQLE 159 will return the pre-computed results rather than performing the computation a second time. Pre-compute operations may be performed by a predictive pre-computes generator 159a provided within the SQLE 159. The predictive pre-computes generator 159a tries to predict which pre-compute operations will be most desirable and/or which will be least desirable. In accordance with one aspect of the present disclosure, a probability value or score (not shown) is automatically attached to the conditions expression 143.1d of each instructed join command (e.g., 143.1) based on expert knowledge base rules held in a predetermined knowledge base (not shown) that is maintained for indicating current probabilities of instructed table joins. In other words, the scores indicate the likelihood that the join operation will take place if the join instruction 143.1 were to be currently executed. That information can then be used for improving the decision making performance of the predictive pre-computes generator 159a.

A second join instruction is illustrated at instruction line 143.2 where this next instruction specifies different tables for potential joining (e.g., tables F and G) and specifies a different kind of join operation (e.g., a Right join). Although not shown, the ellipses in the instruction line 143.2 are understood to indicate additional parameters including the conditions expression for the specified join operation. Similarly, a third join instruction is illustrated at line 143.3 where yet other tables are to be joined (e.g., tables M and N) using yet another type of join operation (e.g., a Full join). Once again, the ellipses in the instruction line 143.3 are understood to indicate additional parameters including the conditions expression for the specified join operation.

It may be appreciated by those skilled in various search query languages such as SQL that join operations can come in many different flavors including cross joins; natural joins; inner joins; outer joins; equi-joins; full joins and self joins to name a few. The examples given at instruction lines 143.1-143.3 are merely by way of nonlimiting illustration and it is within the contemplation of the present disclosure to account for most or all of such different join operations and/or to provide similar treatment for other forms of big data aggregating operations.

The result of a join operation is a new table having one or more of columns and rows selectively acquired from its parent tables. In the present disclosure, the term "table" is to be broadly construed as having one or more columns (e.g., 161a) and one or more rows (e.g., 161b) where a minimalist table may consist of a single cell (e.g., 161c) having a corresponding named column and named row. The cell itself may be devoid of a value (nil) or may store a value corresponding to its named column and named row. Stored values may be numeric in nature, alphabetic (e.g., text) in nature or otherwise and may have different formats. It is understood that when tables are joined, one of the underlying operations may be an operation that normalizes the column and/or row specifications so that the values in the new table resulting from the join are consistent. For example, it might be inappropriate to have some first numeric values representing kilograms and yet others representing grams in a column specifying a product weight (e.g., for rows specifying different products, where the column is to specify their comparable weights).

When join operation is carried out, the resulting new table may be smaller in size (in terms of one or both of number of rows and number of columns) than one or more of its parent tables. An example of such a smaller or sub-table is shown at 163. On the other hand, the result of a join operation may produce a new table having more rows and/or more columns than at least one of its parent tables. An example of such a larger or super-table is shown at 164 where, although not explicitly shown, the number of columns can be greater than that of either parent table (e.g., 161 and 162). For some join operations, the resulting new table may have the same dimensions as each of its parent tables or it may have the sum of the row and column dimensions of its parent tables. Stated otherwise, the tables resulting from various join operations can have different sizes depending on the specifics of the join operations. In accordance with one aspect of the present disclosure, the size of a new table resulting from a given join operation is taken under consideration when deciding whether to perform a pre-join operation for creating that new table before a corresponding join instruction is executed in one of the database-using applications (e.g., 141-143). Before executing a join operation, the application automatically checks a directory (not shown, but could be inside storage 146 or in database 160) to see if a currently-usable pre-join has already been performed, for example by an enterprise maintained pre-joining application 145. (As noted above, more typically a database query drive engine (SQLE) such as shown at 159 will carry out the query tasks Q delegated to it and will internally automatically test a pre-computes directory to see if the results of requested query operations W have already been pre-computed and stored. The SQLE 159 will typically include a predictive pre-computes generator 159a to which the here-disclosed methods may be applied. It is within the contemplation of the disclosure that all or a portion of the disclosed methods may optionally be carried out by an enterprise-controlled pre-joining application 145. System performance speed and efficiency can be improved by relying on pre-execution creation of joins rather than executing a separate join operation each time each application needs the corresponding join result. However, system performance speed and efficiency may suffer if the wrong subsets of tables are pre-joined (e.g., ones not needed at all or ones needed only infrequently or on a non-urgent basis) because system resources (e.g., storage 146 and/or data processing bandwidth 147) may be inappropriately consumed for creating pre-joins that are rarely if at all needed or not needed in a hurry. A problem is how to efficiently and timely determine which pre-joins are desirable and which may be undesirable (e.g., wasteful of system resources).

Still referring to FIG. 1C, in instructions area 143.4 of the exemplary magnification 143a of one of the DB-using apps, one or more of the new tables that have been earlier formed by one or more of the conditional join instructions 143.1-143.3 are analyzed. Instructions within area 143.4 may call for further conditional joining of two or more of the new tables formed by previous join instructions 143.1-143.3. The latter new tables may be further analyzed and so on. Thus it is possible to generate large numbers of newly joined tables having sizes smaller and/or larger than or the same as the initial base tables (e.g., 161-162) obtained from the database 160. Depending on complexity and size (as well as memory access latency), significant amounts of system time and system resources may be consumed in forming the various join tables produced by respective ones of the database-using applications (e.g., 141-143). Thus it is valuable to have a pre-join application 145 (or many such applications) that can easily scale to handle large numbers (e.g., thousands, hundreds of thousands) of pre-join possibilities and to identify the ones that are best for being pre-joined in light of continuously evolving (see 120) enterprise internal and external (110) situations.

In instructions area 143.5 of the exemplary magnification 143a, result reports (based on the carried out analyses 143.4) are generated. The generated result reports may be ones for consumption by human administrators or by automated artificial intelligence agents where either or both of the latter can then react in response to their understandings of the generated result reports. More specifically, if a generated result report (not shown) is delivered to the marketing department 151 indicating a predicted near term demand or increase in demand for a certain kind of product and/or service by an emerging or growing customer demographic, then the marketing department 151 may ask the engineering department 152 to begin designing new or more up to date products and/or services to meet the predicted demand. In turn, the engineering department 152 may create new query applications or revise old ones and run those to help them design the requested products and/or services. Instructions area 143.6 represents a further portion of the magnified application 143 where new or revised tables are generated, for example based on the carried out analyses 143.4. Instructions areas 143.5 and 143.6 do not have to appear in the illustrated order and may be intermixed. Either one or both of the generated reports (143.5) and generated new or revised tables (143.6) may result in one or more follow-up activities of creating new or revised analysis programs such as is indicated in follow-on block 149 where one example is the above described tasking of the engineering department 152. The created new analysis programs of block 149 (e.g., those responsively produced by the engineering department 152) would then be added into the set of the latest database-using applications (e.g., 141-143) already present within the data processing resources 140 of the enterprise 150. The newly created analysis programs may call for new table joins different than those of the previous applications (e.g., 141-143) and/or may use same table joins as those called for by the previous applications (e.g., 141-143). Thus the needs of the enterprise 150 can continuously change as it predicts or responds to changes in the rest of the world 110 or internally within the enterprise 150 (e.g., reorganization of departments and responsibilities).

It is to be understood from FIG. 1C that in addition to the database-using applications (e.g., 141-143), the data processing resources 140 of the enterprise may include yet other resources as illustrated through magnification 140b where those other resources can include but are not limited to local and remote data storage resources 146 (e.g., both high speed small capacity ones and slower speed larger capacity ones), local and remote central processing units (CPU's) and/or other such data processing units 147 and machine-user interfaces including information displaying interfaces such as indicated at 148. Among the data storage resources of the enterprise there will be storages of system logs including execution logs 146a that contain information of when, where and how often in recent history (e.g., past 6 months) various ones of the database-using applications (e.g., 141-143) were run. In one embodiment, the execution logs 146a may include traces indicating the identities of newly formed join tables and the types of joins that form them (e.g., left, right, or full); indicating their respective sizes and/or number of columns and number of rows; and indicating which executing applications (e.g., 141-143) created those newly formed join tables and how often the various applications were executed. In accordance with the present disclosure, these types of logged data may be used to construct usage-representing graph structures whose descriptive data is automatically repeatedly stored and/or updated within system memory (e.g., within storage 146).

Referring to FIG. 1D, shown is an elementary graph structure 130 having a connector 133 representing a join instruction. The output of the represented join instruction 133 (assuming the instruction is executed) is not shown. Node 131 represents a first table (or sub-table, or super-table) identified within the instruction 133 as a candidate for joining. Node 132 represents a second table (or sub-table, or super-table) identified within the instruction 133 as a candidate for joining. Although FIG. 1D assumes a binary join operation, it is within the contemplation of the present disclosure to alternatively graph aggregation instructions which join together more than two identified tables. In the latter case, connector 133 might be shown in the form of two or three lines/spoke coming together at a juncture point/hub (e.g., as a triad). More generally connector 133 may define a hyper edge of a hypergraph. Each of the nodes (e.g., 131, 132) and instruction-representing connector 133 of the graph structure 130 has associated metadata stored on its behalf to represent relevant attributes of that graph structure element. In the case of the edge metadata 134 that is linked with connector 133, the included metadata (not yet shown) may comprise identifiers of the nodes (e.g., 131, 132) at the terminal ends of that connector 133, an identification of the type of aggregation or other operation to be performed (e.g., full, left or right join) and an identification or description of conditional parameters of the aggregation instruction including at least one parameter indicative of the probability that the aggregation instruction will be executed.

The node metadata (e.g., 135) of each respective node (e.g., 132) may include one or more of an identification of the respective table (or sub-table, or super-table; e.g., Tbl_ID_2) that the node represents; an indication of the table size and/or of extents of its respective two or more dimensional axes (although 2D tables are used as examples, the disclosure also contemplates tables of greater dimensionalities); an indication of how many operation-representing connectors (e.g., 133) connect to that node (could be 0), an identification of one or more of the connectors (if any) that connect to the node and an identification of a type of storage (e.g., fast cache versus slow disk) where the data of the represented table is stored.

In one graphic user interface (GUI) that displays the exemplary graph structure 130, the metadata of the respective elements (nodes and connectors) are not normally displayed, but may be shown when the user hovers a cursor or other pointer over the element and/or clicks on that element. In the same or an alternate GUI environment, connectors (e.g., 133) whose represented instructions (e.g., a join instructions) have relatively high probabilities of being carried out are represented as correspondingly thick connector lines while connectors of other instructions having relatively lower probabilities of execution are represented as correspondingly thinner connector lines. In the same or an alternate GUI environment, nodes (e.g., 131) whose represented tables (e.g., Tbl_ID_1) have sizes falling within a predetermined and preferred range of table sizes and/or whose represented tables are stored in a predetermined and preferred type of data storage (e.g., fast DRAM) and/or whose represented tables are connected to by a number of connector lines (e.g., 133) greater than a predetermined edge number threshold are represented by icons (e.g., internally colored and/or shaded circles, triangles, squares etc.) having greater density (and/or closeness to darker hues) than other icons used for representing other tables whose attributes fall outside of one or more of the preferred ranges. Thus when a user views the graph structure on such a GUI, some clusters of nodes and respective connectors will appear as dense and/or darkly colored while other nodes and respective connectors will appear as belonging to sparsely populated and/or lightly colored regions of a composite graph structure (see briefly FIG. 2B).

Figure 2A:
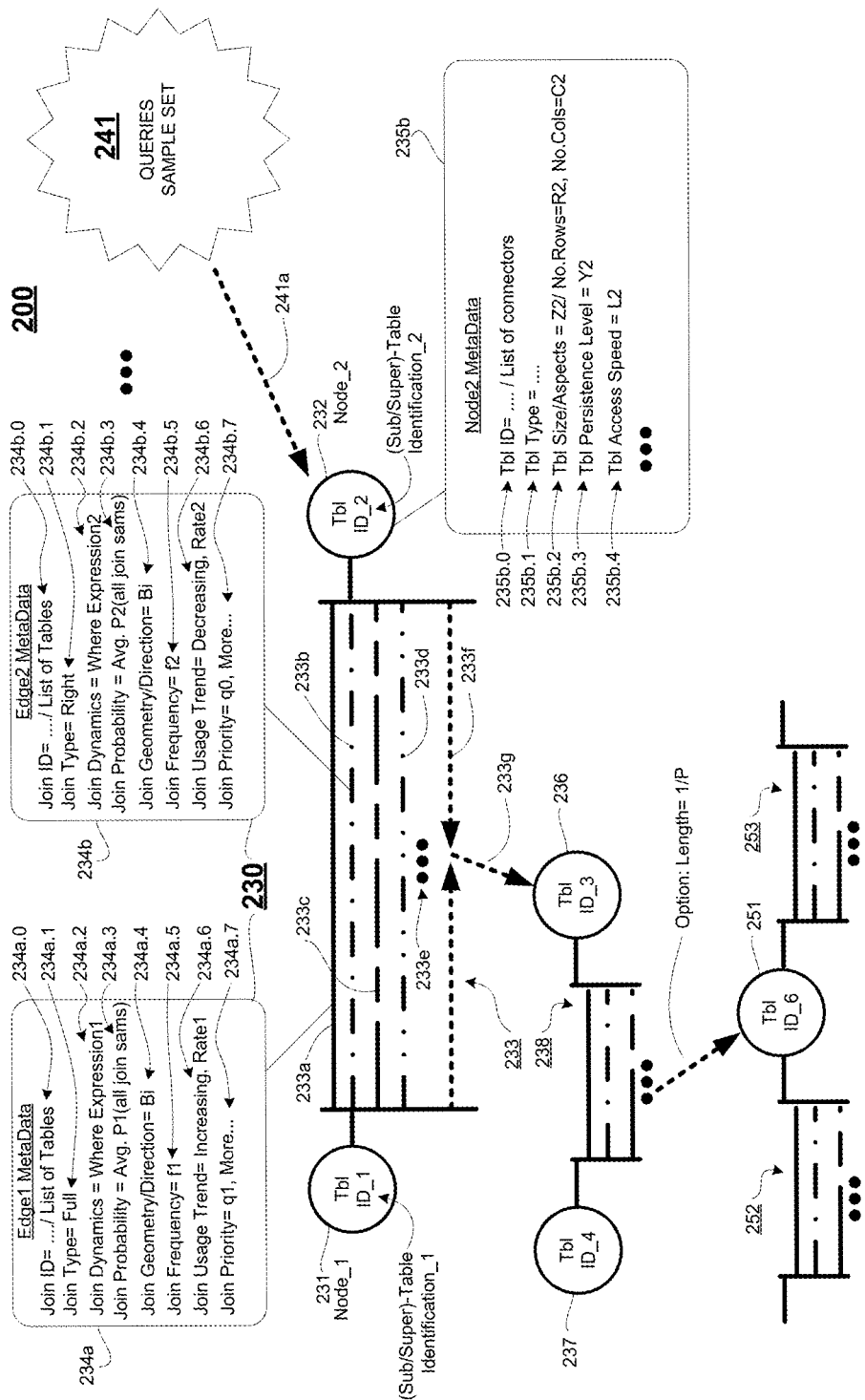
FIG. 2A is a schematic diagram depicting a graph structure in accordance with the present disclosure having nodes representing database tables and links representing different kinds of aggregation operations such as pre-join operations.

FIG. 2A depicts in more detail an example of a composite graph structure 230 that may be used in an automated pre-join determining system 200 in accordance with the present disclosure. The graph structure 230 is initially populated only with nodes representing explicitly named, base tables found in a sample set 241 of the database-using applications (e.g., 141-143 of FIG. 1C). Here, the base tables are those that are explicitly stored in the enterprise-accessible database 160 rather than other tables that are formed by join operations. The sample set 241 of database-using applications may be picked based on any of a number of sample size limiting conditions including, but not limited to, having a frequency of use within a predetermined time period (e.g., last 3 months) exceeding a predetermined first time threshold and/or having an urgency of use (a.k.a. priority) within a predetermined time period (e.g., last 1 month) exceeding a predetermined second time threshold. The number of pre-joins that are performed should be limited because there is a point of diminishing returns where some pre-joins are too large, too small or so infrequently used that consumption of system memory space and consumption of system execution bandwidth is not worth the time savings later attained when the corresponding application programs call for the respective join operation. Among the sample size limiting conditions that may be used for defining the sample set 241 are: (a) the frequency of execution of each candidate application within a predetermined recent duration of time (e.g., last six months); (b) the number of enterprise departments and/or users launching each candidate application within a predetermined duration of time (e.g., last three months); (c) priority weights assigned to each of the candidate applications with respect to the importance of the results and/or required speed by corresponding departments/users where the assignment occurred within a predetermined duration of time (e.g., last month); (d) user/department priorities assigned to a top N using departments or users of each of the candidate applications (where N is an integer such as in the range 2-10); and (e) time for completion of each of the candidate applications where a long time of completion is attributed to logged table aggregation operations within those applications.

As or after the composite graph structure 230 is populated by the base tables, the sample set 241 of database-using applications is scanned to determine which join instructions touch on each of the explicitly named base tables. Corresponding connector elements (e.g., connectors set 233 having different connector subsets 233*a*, 233*b*, 233*c*, etc.) are added to the composite graph structure 230 to represent the found join instructions. In FIG. 2A, subsets of different types of join operations (e.g., full, right, left, etc.) are depicted by different types of dashed or non-dashed lines. By way of example, solid line 233*a* represents a first subset of join instructions whose corresponding metadata is shown at 234*a*. Meta-data entry 234*a*.0 can provide one or both of a unique identification for a corresponding subset of joins represented by the connector 233*a* and a link to, or list of the tables joined by that represented connector 233*a* (e.g., Tbl_ID_1 and Tbl_ID_2). Meta-data entry 234*a*.1 can indicate the join type (e.g., Full) of the corresponding subset of joins represented by the connector 233*a*. Meta-data entry 234*a*.2 can indicate other join parameters (e.g., types of Where expressions) of the corresponding subset of joins represented by the connector 233*a*. Meta-data entry 234*a*.3 can indicate an average probability or range of probabilities (e.g., Min, Max and median) for the corresponding subset of joins represented by the connector 233*a*. Note that each connector line (e.g., 233*a*) will typically represent a plurality of join instructions for the given join type (indicated by 234*a*.1) where each of the join instructions has a respective probability of being actually executed (e.g., due to its join dynamics 234*a*.2). The composite of those probabilities of execution for the sampled set 241 of inquiries will have a corresponding one or more composite probability parameters such as an average probability, a median probability, a minimum probability and a maximum probability. These may be listed in metadata field 234*a*.3 and afterwards used to determine whether a pre-join should be performed.

Additionally, the respective connector metadata 234*a* of exemplary graph edge/connector 233*a* may include one or more entries 234*a*.4 indicating the geometry and/or direction (or non-directiveness) of the represented connector. A typical connector may be a binary one with just two terminals, one at each end, and each connecting to a respective table node (e.g., 231 and 232) and it will typically be non-directional. However, it is within the contemplation of the present disclosure to have hub and spokes connectors with three or more spokes each terminating at a respective table node. It is also within the contemplation of the present disclosure to represent connectors some or all of whose spokes have specified directions. In one example, the resultant outputs of a represented set of join operations (233*f*)

may be represented by a directional output spoke as depicted at 233g. In one embodiment, the length of each directional output spoke is displayed as being proportional or otherwise functionally related to the reciprocal of the average or median probability of the represented set of join operations (e.g., L=k*1/P or f(k, 1/P)). Thus, the output spokes of more the more likely to be executed join instructions will be displayed as relatively short and will produce correspondingly dense graph structures (see briefly 271 of FIG. 2B) while the output spokes of less likely to be executed join instructions will be displayed as being relatively long and will produce correspondingly sparse graph structures (see briefly 274 of FIG. 2B).

Still referring to FIG. 2A, yet another meta-data entry 234a.5 may indicate the relative frequency (e.g., f1) or number of occurrences of the represented set of join instructions within a correspondingly predetermined recent duration of time (e.g., last few weeks). This relative frequency indicator (e.g., f1) or number of occurrences indicator (T/f1) may be derived from a logged number of times that a sampled application program of sample set 241 was executed during a predetermined recent length of time (e.g., past two weeks) and/or from a logged number of times that the join operation or a subset thereof is used in the sampled application program.

A further metadata entry 234a.6 indicates trending information for the represented subset of join operations, for example whether they are increasing or decreasing over a predetermined recent duration of time (e.g., past week) and optionally the rate of change. This trending information may be used as part of a determination as to whether to perform the represented pre-join operation (e.g., a full join of Tbl_ID_1 and Tbl_ID_2) or not.

Yet additional metadata entries 234a.7 may be provided for use in making the determination as to whether to perform the represented pre-join operation (e.g., a full join of Tbl_ID_1 and Tbl_ID_2) or not. One example may be an average of join priorities assigned to the represented subset of joins (of connector 233a) based on the importance of having the pre-join results readily available as quickly as possible. Another prioritizing weight (not shown) may indicate an average or median of user/department priorities assigned to the top N enterprise departments or users that use the represented join operation. Although not explicitly shown, it is within the contemplation of the present disclosure to provide one or more weight parameters (e.g., w1, w2, etc.) within the metadata 234a of the respective connectors where these one or more weight parameters are functions of one or more elemental characteristics of the connector. The elemental characteristics may include but not limited to: frequency or popularity of usage within one or more predetermined time durations; urgency of quick result availability within one or more predetermined time durations; access priority assigned to one or more users or departments that have made use of the join results within one or more predetermined time durations; and so on. The below described determination of whether or not to perform a corresponding pre-join can be based on one or more of these weights.

Referring to a second illustrated connector symbol 233b, its corresponding edge metadata is shown at 234b. Similar reference numbers in the range of 234b.0 through 234b.7 are shown for that corresponding block of metadata 234b and a repeat of these details is not necessary except to note that the join type indicated at 234b.2 for this subset of found instructions is a right join rather than a full join as was the case for counterpart entry 234a.2.

Yet further subsets of same type join operations may be represented by yet other connectors such as 233c shown for the set of connectors 233 interposed between nodes 231 and 232. For example the join type for the subset of joins represented by connector 233c might be a Left join as opposed to the right join specified at 234b.1 and the full join specified at 234a.1. It is within the contemplation of the present disclosure that either or both of a Right join and a Left join may be covered by performance of a Full pre-join since Left and Right joins are subsets of a full join. Accordingly, in one embodiment, after an initial determination of which pre-joins to perform, the results are scanned for duplicate efforts; for example one specifying both a left join and a full join of the same tables and redundant pre-joins are eliminated; for example deleting a left join when the same results are included within a full join of the same tables.

Further types of subsets of joins are represented by connector line 233d and 233e. An example of a tri-spoked connector is shown at 233f where spoke 233g directionally links to the result of the join operation; that result being a new table Tbl_ID_3 represented at node 236. Result outputting spoke 233g may have its own metadata (not shown) where the latter includes an indication of the probability of result 236 being created. The created new result table (represented by node 236) may be found to be an input member of further sets of join operations including the typed subsets indicated at 238 (where the counterpart table for binary joins is represented in node 237 as Tbl_ID_4). The further sets of join operations (e.g., 238) may lead to yet further likely creations of additional tables (e.g., Tbl_ID_6 represented at node 251) where such additional tables 251 may be touched by yet further connector sets as shown for example at 252 and 253.

Referring to the respective node metadata block 235b of corresponding table node 232 (representing Tbl_ID_2), a first of the meta-data entries 235b.0 may provide a unique identification (Tbl_ID) for the respective table and/or a list of connectors or connector spokes that terminate at that represented table. A further metadata entry 235b.1 may indicate the type of the table. By way of nonlimiting examples, database tables may have different schemas and/or dimensionalities and are not necessarily limited to the two dimensional (2D) examples illustrated here. A corresponding metadata entry 235b.2 may indicate the size of the table (e.g., Z2) in terms of consumed bytes and/or numbers of data elements. The corresponding metadata entry 235b.2 may alternatively or additionally indicate the dimensional aspects of the table such as in terms of the number of rows (e.g., R2) held within the table and the number of columns (e.g., C2) held within the table. In accordance with one aspect of the present disclosure, the size of a table resulting from a join operation is taken into account when determining whether or not to perform a corresponding pre-join operation. For example, it may be automatically determined that the resulting table is too large in size and two infrequent in its logged usage history to warrant consuming limited system storage (e.g., 146) and consuming limited system data processing resources (e.g., 147) just to have a pre-performed join result of that one, too large and relatively infrequently used table (e.g., Tbl_ID_2).

Yet other node metadata entries such as illustrated at 235b.3 may indicate how persistent the represented table is expected to be. More specifically, the output results of certain pre-join operations may be kept in system storage for relatively long periods of time because many database-using applications (e.g., 141-143) are expected to use the pre-join results over predicted long periods of time while in counterpoint, output results of other pre-join operations may be predicted to be kept in system storage for substantially shorter periods of time because only a few, short-lived database-using applications are expected to use those other pre-join results. The data persistence information of entry 235b.3 may be useful in determining when to perform a pre-join operation and when to allow the data of that pre join operation to be overwritten by the data of a later performed pre-join operation.

Additional node characterizing metadata, such as represented at 235b.4 may indicate the data access latency (e.g., L2) of the resultant table. For example, if the table is sufficiently small (e.g., size=Z2) it may be practical to store that table in a high-speed cache memory so that the results of the pre-join operation can be quickly accessed and used. This information may contribute affirmatively to the decision of whether or not to perform a pre-join operation that results with the node characterized table. As indicated by the ellipses in the block 235b, yet further metadata may be stored for characterizing the table represented by the corresponding node 232.

Figure 2B:
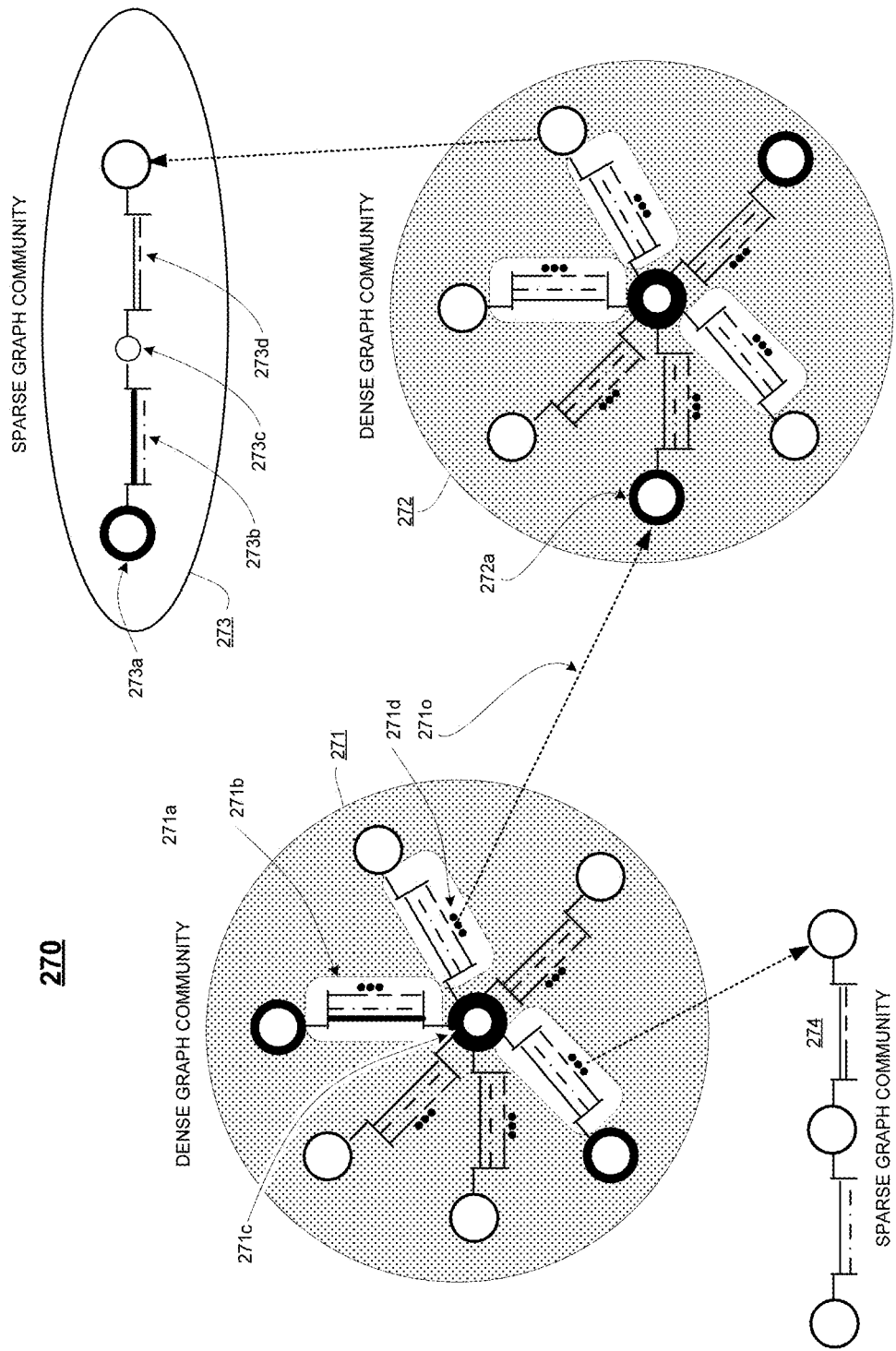
FIG. 2B is a results graph after community detection.

Referring to FIG. 2B, shown are example results of graph structures formed out of the elements of FIG. 2A and then segregated using one or more graph community detection algorithms. One example of a graph community detection algorithm is the Girvan-Newman process whose steps may be summarized as follows: (a) compute betweenness centrally for each graph edge; (b) remove edge with highest score; (c) re-compute all scores; (d) go to step (b). The computational complexity of the basic Girvan-Newman process is $O(n^3)$. However many variations and improvements have become known in the art of graph community detection, for example those that improve precision by use of different betweenness measurements and those that reduce computational complexity for example through use of sampling and/or local computations. It is within the contemplation of the present disclosure to use either the basic Girvan-Newman process or one of its variations and/or other forms of graph community detections to separate the graphed join operations into densely populated graph communities and sparsely populated graph communities that are further hierarchically partitionable. In one embodiment, the graph is first filtered to remove one or more types of joins while keeping at least one join type. Then partitioning into separate graph communities is performed. The total sizes of the pre-joined tables in each densely populated graph community is determined. If too large, further partitioning is performed to create smaller graph communities. Then the priorities of the tables in each densely populated community are sorted and a predetermined top M ones of them are pre-joined (where M is an integer for example in the range 3-20).

The example of FIG. 2B shows that a first densely populated graph community 271 has been separated by a graph community detection process from second and third sparsely populated communities 273 and 274 as well as from yet another densely populated community 272. The higher densities of dense communities 271 and 272 may be attributable to core nodes such as 271c that are touched on by a relatively large number of connectors or connector spokes and/or attributable to highly probable join operations (e.g., represented by short or thick graph connectors) as opposed to join operations predicted to have substantially lower probabilities of execution and/or join result usage. An example of a join operation predicted to have a high probability of execution and repeated use and/or predicted to have a relatively high urgency of quick accessibility is represented in block 271b by the comparatively thickened connector line of a given join type. Nodes with thickened borders such as at 271a and 271c represent tables that are touched on by a number of connectors (graph edges) greater than a predetermined edge number threshold (e.g., three or more) and/or by connectors having one or more edge weights representing desirability of pre-join availability due to urgency or other factors. It is understood that in FIG. 2B, not all connectors and nodes are shown so that illustrative clutter is thereby avoided.

The example illustrated at 273 is that of a sparsely populated graph community. Community detection may determine that a respective community (e.g., 273) is a separate community even though the latter may have one or more above-edge number threshold touched nodes (e.g., 273a) and/or even though the latter may have one or more above-edge number threshold probabilities of the join execution (e.g., thick connector inside 273b). The determination may instead be based on detection of other nodes (e.g., 273c) that are not touched by a sufficient number of connectors (e.g., 273d) and/or are not touched by connectors of sufficient probability of execution (e.g., thin lines inside 273d).

It is to be understood that the boundaries of the graph communities may be altered after being initially defined. For example, the table of node 272a may be the result of a join output spoke 2710 of a join connector 271d initially placed inside graph community 271. However, it may be discovered that the table of node 272a is too large to use and it is preferable to pre-store the smaller tables (not shown) of join connector 271d as partial pre-join results belonging inside the boundary of graph community 272. In other words, node 272a is broken apart or partitioned into precursor nodes representing smaller sized tables and the representative nodes for those smaller sized tables are moved into or copied into the boundaries of graph community 272 thereby altering graph community 272. Usage for such a modification will be described further below.

Figure 3:
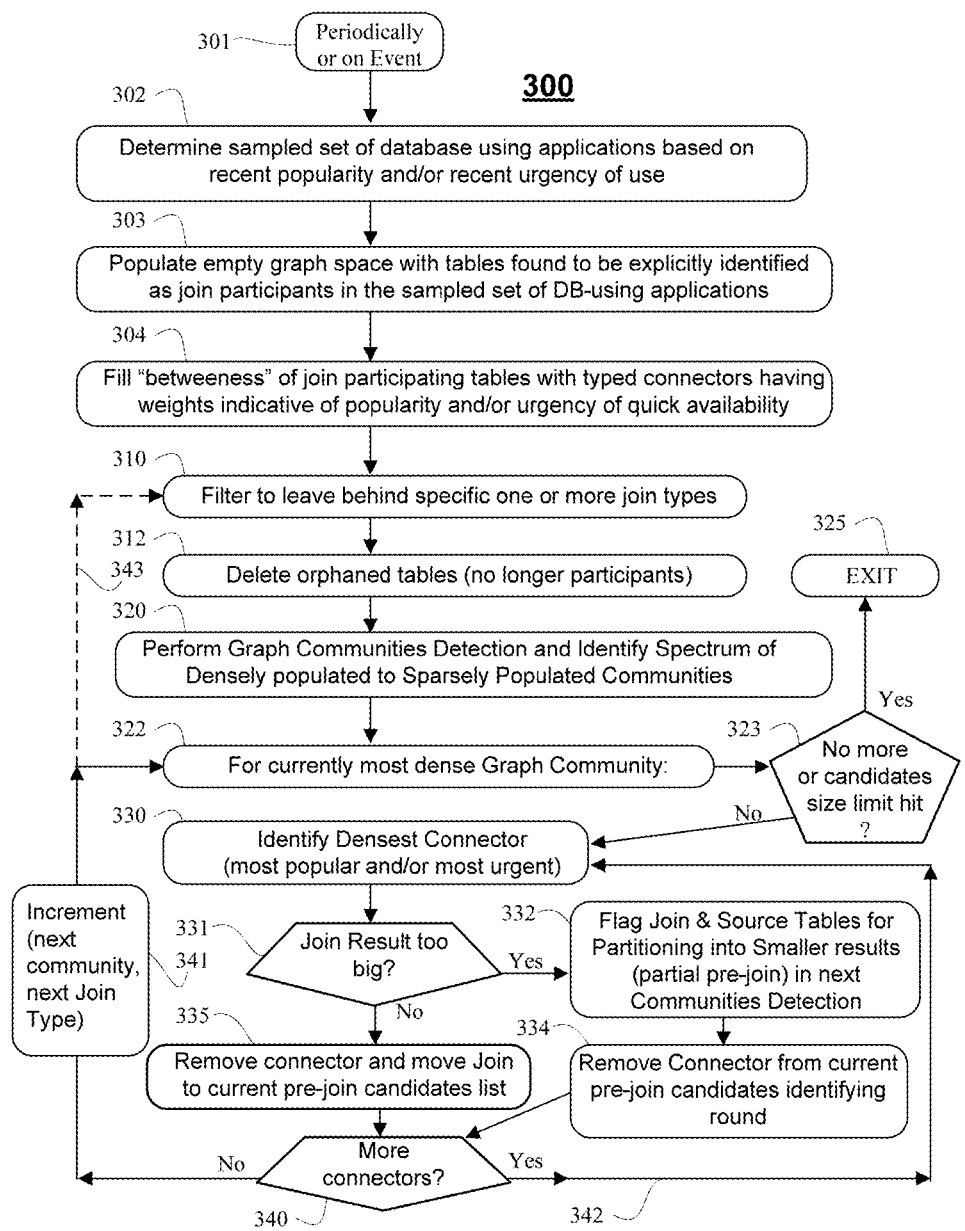
FIG. 3 is a flow chart depicting the procedures for identifying pre-join candidates.

Referring to the flow chart of FIG. 3, a process 300 in accordance with the present disclosure is now described. Entry into process 300 may be made at step 301 on a periodic and/or event driven basis. The periodicity of entry at 301 may be reflective of time durations over which enterprise usage patterns change or situations in the external world (ROTW 110) typically change; for example on a biweekly basis or on financial quarterly report bases. Events that trigger entry at 301 may include unusual financial events or world news events such as major increases or decreases in valuations of financial instruments; release of disruptive technologies; beginnings or terminations of belligerent activities and so on.

At step 302, a determination is made as to which database-using applications are to be considered as part of a sample set (e.g., that of 241 in FIG. 2A) based for example on recent popularity of usage of those applications and/or based on recent urgency for quick results from those applications.

At step 303, an empty graph space is populated with nodes respectively representing tables that are found to be explicitly identified as aggregation operation participants in the sampled set of DB-using applications (e.g., 141-143). At step 304, the spaces between the nodes of the respective participant tables are populated by corresponding, typed connectors that each have edge weights indicative of popularity and/or urgency of quick availability of the represented join operations.

At step 310, the graph results are optionally filtered to leave behind the connectors of a pre-specified one or more types of join operations; for example only those of left, right, and full joins. Then, at step 312, orphaned tables which no longer have any connectors touching them, meaning they are no longer participants in any join operation; are removed from the graph.

At step 320, a graph community detection process such as the above mentioned Girvan-Newman process and variations thereof is performed to thereby identify a spectrum of graph communities spanning from those that are densely populated to those that are sparsely populated. The densely populated communities are separated out from the sparsely populated ones. It is understood here that the densely populated graph communities each represent a compilation of join operations of a given one or more types (as pre-filtered at steps 310-312) which preferably have pre-joins performed for them due to popularity of usage and/or urgency of access to quick results. By contrast, the sparsely populated graph communities each represent individual or compilations of join operations which preferably do not have pre-joins performed for them due to infrequency of usage and/or lack of need for access to quick results.

Prior to step 322, the isolated graph communities are sorted so as to list the most dense such community first. Step 322 is part of a loop (carried forward from step 341) which increments through each of the progressively less dense graph communities. Test step 323 advances to step 330 as long as there are more graph communities with densities above a predetermined minimum density threshold and space in the allocated pre-computes area of memory for further candidates. At step 330 and for the currently most dense graph community, an identification is made of the densest connector found within that community; where the density of the identified connector indicates that it is a relatively most popular and/or most urgent of the join-representing connectors within the current community.

At step 331, an estimate is made of the size of the resulting table that would be created if the represented join operation were performed. In the illustrated process, it is understood that a finite amount of storage has been set aside (allocated) for storing the results of pre join operations and that some results may be too large relative to a predetermined limit on results size. System administrators may have decided that it is preferable to pre-join a greater number of smaller results rather than just one extra large result. If the outcome of the size test at step 331 is yes, meaning the estimated result is too large, control passes to step 332 where the to-be-bypassed connector and its associated participating tables are flagged for inclusion in a later-to-be carried out partitioning operation where one or both of the participant tables are broken apart or partitioned into smaller tables whose join results can be accepted in a later round of community detection. Then at step 334, the connector whose join result was too large is removed from a current list of pre-join candidates. At subsequent test step 340 it is determined whether there are more connectors (e.g., pre-sorted according to priority) left to consider. If there are no more connectors, path 341 is taken in which there is an increment to the next graph community or to a next join type. On the other hand, if more connectors are left behind, path 342 is taken back to step 330 where the next densest connector is considered.

If the result of test step 331 indicates that the estimated result is not too big, then control continues to step 335 where the corresponding join operation is appended to a current pre-join candidates list and the considered connector is removed from the graph. This is followed by continuation into test step 340. If all the connectors of a first graph community are exhausted at test step 340, then incrementing step 341 advances to the next graph community and if all those are exhausted then extension path 343 allows the system to repeat the process for a different subset of join types.

As incrementing to a next densest graph community is carried out at step 322, an internal test 323 is first carried out to determine if there are any more candidate graph communities and/or if a memory capacity limit has been hit for the pre-allocated amount of storage that has been dedicated for pre-join results. If there are no more candidates or the capacity limit has been hit the process exits at step 325.

Figure 4:
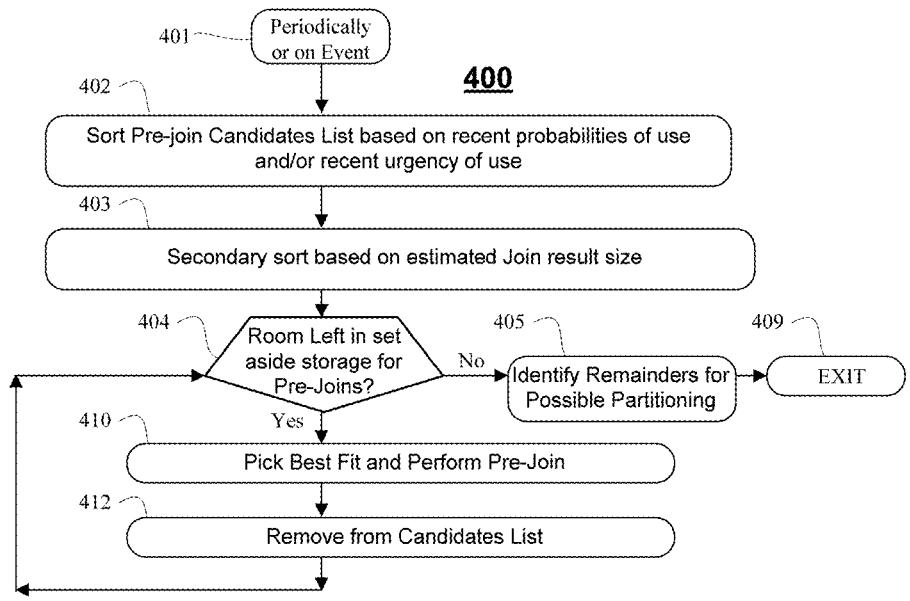
FIG. 4 is a flow chart depicting a method for picking out preferred pre-joins to perform.

Referring to FIG. 4, shown is a flow chart 400 for a process in which the actual pre-joins are performed. Entry into the process may occur periodically and/or on an event driven basis at step 401. One of the triggering events may be based on process 300 having recently been executed and detected to produce a different set of pre-join candidates. At step 402, the pre-join candidates in a respective list of such candidates are sorted on the basis of one or more keys where a first of the sort keys can be a probability indication indicating likelihood that the pre-join candidate will be referenced by one or more database-using applications and with relatively high frequency (e.g., at least a few times per hour or day). A second of the sort keys can be an urgency indicator indicating a degree of urgency for rapid availability of the pre-join result. This is another factor that may be used in determining which pre-joins will be generated and stored before they are needed and which will not. Pre-join urgency may also be used to indicate which type of storage the generated pre-join is stored in. For example for pre-join results of extreme urgency, the results may be stored in a high-speed memory area whereas generated pre-join results of lower urgency may be stored in a lower-speed memory area. Sorting step 402 may be carried out using the first key first and then the second one or vice versa.

After a sorted list of pre-join candidates is generated by step 402, a secondary list of the same pre-join candidates, or indices to those in the first list is formed at secondary sorting step 403. Here, the pre-join candidates are ordered according to estimated result size of the not-yet carried out pre-join operation. A reason for performing this secondary sorting step 403 is so that maximum usage of available storage capacity can be made based on a combination of factors including probability of use, urgency of use and space remaining in the storage capacity that has been allocated for pre-join results.

At step 404, it is determined whether there is still room enough present in the set-aside storage that was allocated for pre-join results so that at least one of the more often used/higher urgency candidates can have its pre-join results stored in the set-aside storage area. If yes, control passes to step 410 where a best-fitting one of the pre-join candidates is picked, the selected corresponding join operation is performed, and the results are stored in the set-aside storage area. In step 412 the picked pre-join candidate is removed from the candidates list. Then control returns to step 404 for testing whether yet another candidate can fit into the remaining part of the set-aside storage area. If not, control passes to step 405. In step 405, the left behind pre-join candidates are tested to see if any of them can be partitioned into a set of smaller join operations that ultimately produce the end result of the respective left behind pre-join candidate. Those of the left behind pre-join candidates that can be successfully partitioned into a set of smaller join operations are identified as such. Then an exit his made out of process 400 at step 409.

Figure 5:
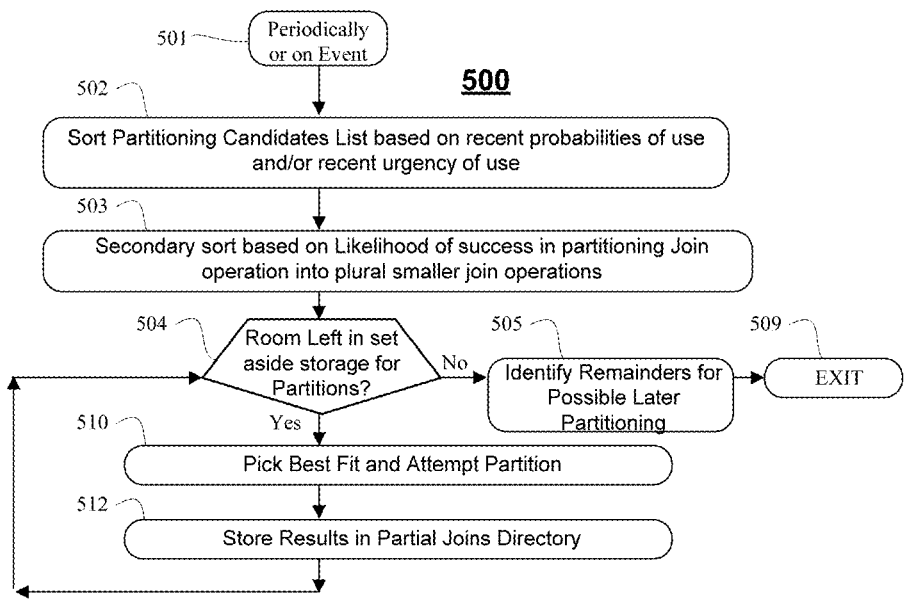
FIG. 5 is a flow chart depicting a method for partitioning left behind pre-join candidates.

Referring to FIG. 5, shown is a flow chart 500 for a process in which the identified partitioning candidates (those identified in step 405) are considered for partitioning and storage in additional memory allocated for partitionable parts of the identified partitioning candidates. Entry into the process may occur periodically and/or on an event driven basis at step 501.

At step 502, the identified partitioning candidates are sorted based on the most recent probabilities that one or more of their partitions will be referenced at relatively high frequency or requested on the basis of relatively high urgency. At step 503, a secondary sort or indices into the first sorted list (that produced by step 502) is/are produced based on an analysis and determination of whether each partition candidate is likely to be successfully partitioned into a set of smaller tables where the more frequently referenced and/or more urgent ones can be fit into remaining memory that is set aside for such partition results.

At step 504, it is determined whether there is room left in the set-aside storage for partition results for at least one of the identified partitioning candidates. If yes, control passes to step 510 where a best likely to fit partition result is identified and the partitioning operation is attempted. At step 512, if the attempted partitioning operation is successful, a subset of the smaller but yet more frequently referenced and/or more urgently needed ones of the partitions are stored in the memory set aside for such partition results. The identity of the corresponding pre-join candidate (namely the pre-join candidate resulting from re-joining of the partitions) is identified and associated in a directory with its correspondingly stored and already pre-joined partitions. Control then returns to step 504. If there is currently no more room left in the set-aside storage for yet more partition results, control passes to step 505 where the remainder of the partitioning candidates are identified for possible later partitioning. Storage capacity can change over time in the enterprise system and thus it may be possible that more partitions can be stored at a later time. An exit is made at step 509.

Referring back to FIG. 1C, it is to be recalled that conditions can be constantly changing both inside the enterprise 150 and outside (in the rest of the world 110). Those changing conditions may include upgrades or downgrades to the local data processing resources 140 of the enterprise and/or corresponding changes (160*a*) to the enterprise accessible databases 160. Those changing conditions may additionally or alternatively include reorganization of the departments (e.g., 151-156) of the enterprise 150 and/or additions, deletions or changes to the database-using applications (e.g., 141-143, etc.) of the enterprise. Any major such change may qualify as an entry triggering event for one or more of processes 300 (FIG. 3), 400 (FIG. 4) or 500 (FIG. 5). Alternatively or additionally any one or more of processes 300 (FIG. 3), 400 (FIG. 4) and 500 (FIG. 5) may be automatically triggered on a respective periodic basis using empirical data to determine what periodicity is best for each. Running them too often may increase system overhead without producing corresponding beneficial results. Running them too infrequently may result in less than optimal system performance based on recent changes made to the enterprise and its resources.

Figure 6:
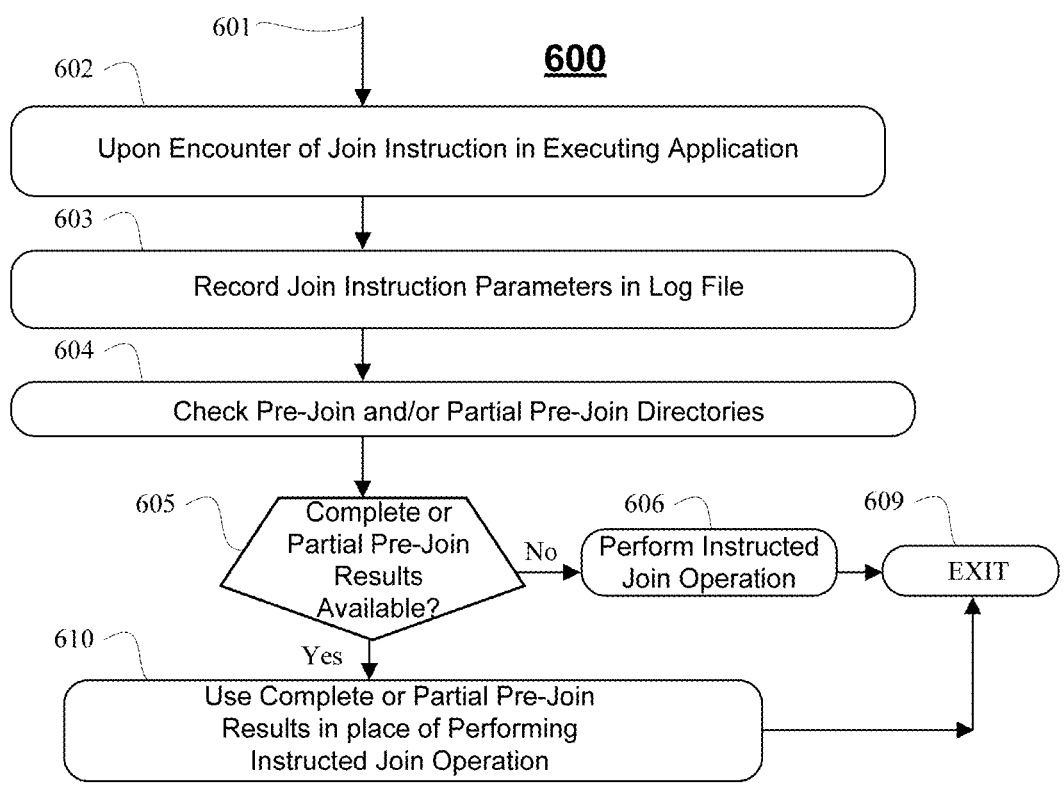
FIG. 6 is a flow chart depicting a method of using pre-joins in place of performing join operations in real time during execution of database-using applications.

FIG. 6 is a flow chart 600 of a process which keeps track of the number of times or frequency at which the results of respective pre-join operations are referenced and opportunistically uses previously stored pre-join results or previously-stored partial partitions of the pre-join results when available. Entry is made at 601. At step 602 the encounter of an instruction within an executing application making reference to the results of a join operation is detected. At step 603 the detected reference to the results of the join operation and its associated parameters (e.g., conditionals) is recorded in a log file. At step 604 before carrying out a join operation to produce its respective results, a check is made of one or more directories including one which lists fully pre-performed join operations whose results are already stored and optionally one which lists partial pre-performed join operations on partitions of the to-be-join tables where those results can be used to complete the desired join operation in less time. At step 605, based on the checking (step 604) of the respective one or more directories, a determination is made as to whether the full pre-join results are already available or at least the results of a partitioned portion of the pre-join are available. If yes, control passes to step 610 where the available results are used in place of redundantly carrying out the join operation and/or where the available partial results are used to more quickly complete the desired join operation. An exit is then made at step 609.

On the other hand, if the result of test step 605 is no, meaning that full or partial pre-join results are not available, then at step 606 the instructed join operation is carried out. An exit is then made at step 609.

Figure 7:
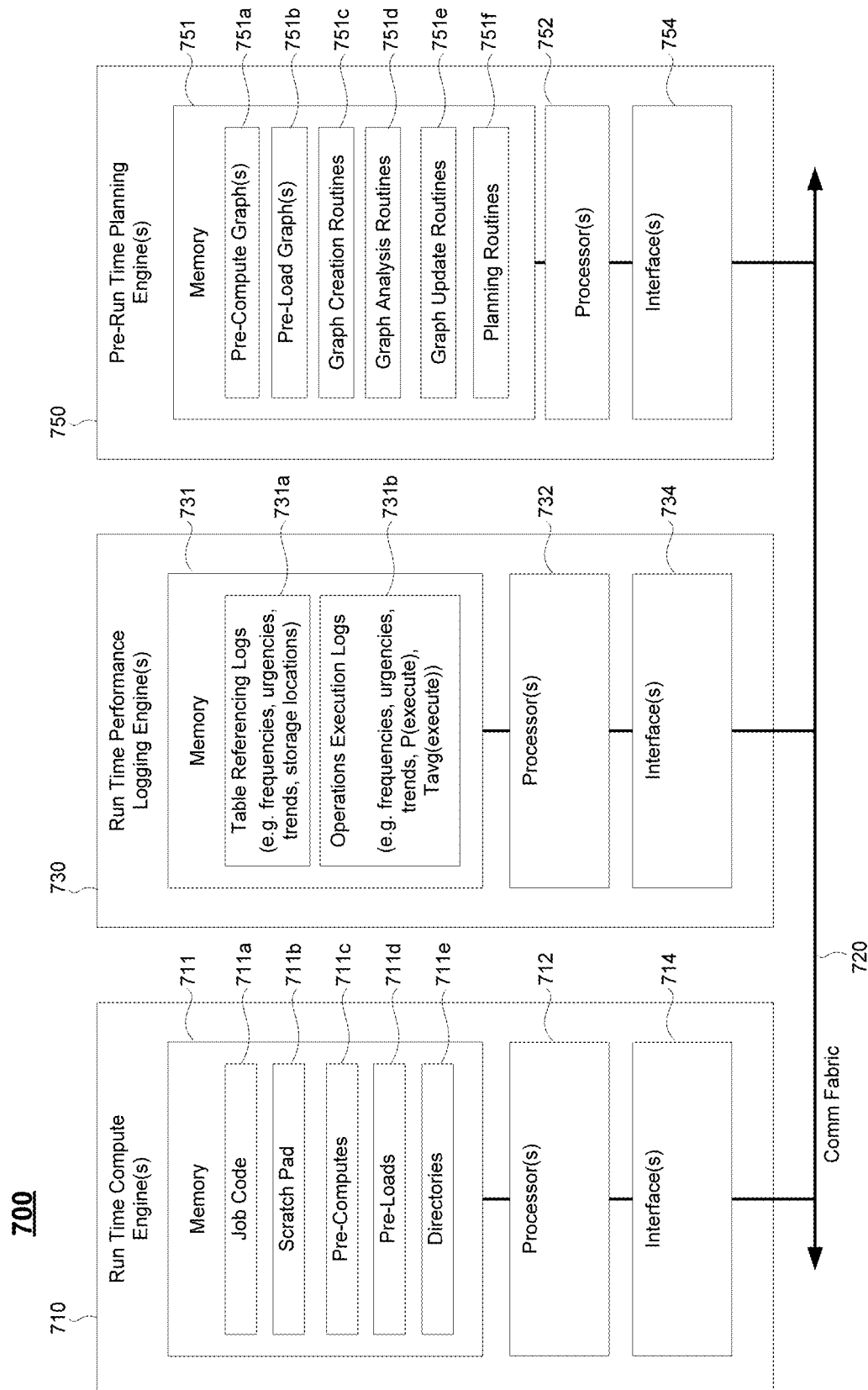
FIG. 7 is a block diagram depicting three types of operatively interconnected engines of a system in accordance with the present disclosure.

FIG. 7 is a block diagram 700 depicting three types of operatively interconnected engines of a system in accordance with the present disclosure. The interconnected engines include one or more run time computational engines 710, one or more run time performance logging engines 730, and one or more pre-run time planning engines 750. The engines 710, 730 and 750 are operatively coupled to one another by way of a common communications fabric 720. The latter fabric may include wireless and/or wired communication resources. Appropriate interfaces 714, 734 and 754 are provided in the respective engines 710, 730 and 750 for communicating by way of the fabric 720. Although not shown, it is to be understood that the communications fabric 720 may extend to operatively communicate with other parts of the partially shown system 700 including one or more pre-load engines (e.g., 14 of FIG. 1A), one or more pre-compute engines (e.g., 29 of FIG. 1A), data fetching engines (e.g., 12) coupled to a big data base (11) and a jobs dispatcher (e.g., 40).

Each of the illustrated engines 710, 730 and 750 includes a respective memory subsystem 711, 731 and 751 configured for storing executable code and data usable by a respective set of one or more processors (712, 732 and 752) of that respective engine. For sake of simplicity and avoiding illustrative clutter, not all the executable codes and in-memory data are shown.

Each run time computational engine 710 may contain job code 711*a* loaded by the dispatcher into its memory 711. Blank memory space 711*b* (a.k.a. scratch pad space) may be set aside for computational needs of the dispatched job code 711*a*. The job code 711*a* may include machine code and/or higher level code (e.g., SQL code). Pre-planned for and already pre-computed results (e.g., pre-joins) may be stored in a memory space 711*c* allocated for storing such pre-computes. Pre-planned for and already pre-loaded data (e.g., DB tables) may be stored in a memory space 711*d* allocated for storing such pre-loads. Lookup tables and/or directories 711*e* may be generated for identifying and located the stored pre-computes 711*c* and stored pre-loads 711*d*.

During run time execution of the job code 711a, an associated run time performance monitoring and logging engine 730 keeps track of how well the job executes. Among the monitored and logged performance parameters are indicators of which pre-computes 711c are used (also how often) and which merely waste storage space in region 711c because they are never used or used extremely infrequently. Other performance parameters may identify run time computes that should have been stored in the pre-computes area 711c (e.g., because they consumed too much of run time resources) but were not and also how often or how urgently they were needed by respective jobs. Yet others of the monitored and logged performance parameters may identify run time data fetches that should have been but were not stored as pre-loads in area 711d. Further indicators may identify which pre-loads are used (also how often) and which merely waste storage space in region 711d because they are never used or used extremely infrequently. Memory area 731a collects statistics (e.g., trending data) over many a run jobs with respect to pre-loading based on how many times and/or with what frequency corresponding DB tables were referenced, with what urgencies, table sizes, from which types of storage locations (e.g., fast, slow). Memory area 731b collects statistics over many a run jobs with respect to pre-computes based on how many times and/or with what frequency corresponding operations (e.g., pre-joins) were executed or contingently executed, what were the probabilities of execution (P(execute)) for each operation or kind of operation, what were the average run times (Tavg(execute)) to completion if completed, what were the completion urgencies and so forth. If multiple run time performance monitoring and logging engines 730 are involved, their individually generated logs may be collected into a central repository. In one embodiment, the multiple run time performance monitoring and logging engines 730 are respective allocated to different departments or other organizational units of an enterprise (e.g., 150 of FIG. 1C) so that performance feedback information can be collected on a per department/organization basis as well as for the whole enterprise.

After run time execution of a predetermined number of jobs and/or periodically, the feedback information collected by one or more of the run time performance monitoring and logging engines 730 is communicated to a corresponding one or more of the pre-run time planning engines 750 prior to execution of a next batch of jobs. The latter engines 750 contain graph creation routines 751c and/or graph update routines 751e configured for generating performance modeling graphs such as shown for example in FIGS. 1D and 2A. Generated graphs may be respectively stored in a pre-compute graphs storing area 751a and a pre-load graphs storing area 751b. The pre-run time planning engines 750 further contain graph analysis routines 751d configured for analyzing the various graphs including on the basis of identifying graph communities having respective vertex and/or edge densities. The pre-run time planning engines 750 may additionally contain planning routines configured for using the results of the graph analysis routines 751d to formulate pre-load and/or pre-compute (e.g., pre-join) instructions that are to be carried out respectively by appropriate pre-load and pre-compute engines (e.g., 14 and 29 of FIG. 1A) prior to or during runt time execution of next batch of jobs. In this way the system is automatically and repeatedly updating its pre-load and pre-compute operations to adaptively maintain efficiency and job execution speed even as circumstances change.

Figure 8:
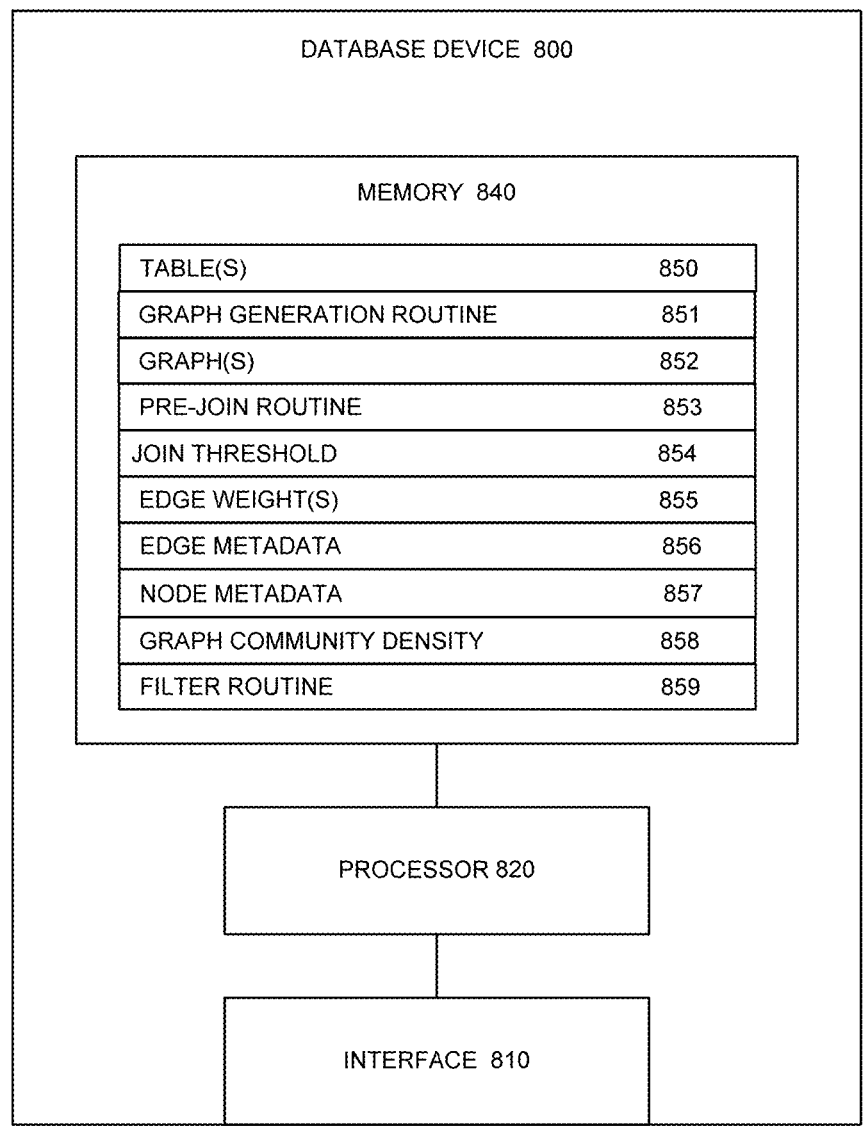
FIG. 8 illustrates a database device according to an embodiment.

FIG. 8 illustrates a database device 800 according to an embodiment. The database device 800 resides in or communicates with the queries processing system 10 of FIG. 1A in some embodiments. The database device 800, when accessing a database of relational tables, can identify a set of pre-join operations to be performed, based on table usage history and/or table priority needs. The database device 800 comprises a processor 820 coupled to an interface 810 and a memory 840. The processor 820 comprises circuit boards, integrated circuitry, and/or associated electronics. Some conventional aspects of the database device 800 are omitted for clarity, such as power supplies, enclosures, and the like.

The database device 800 comprises a computer-implemented device that can process database queries. The database device 800 in some embodiments can comprise the data preloader 14, the pre-computer 29, or the current compute engine 30 of FIG. 1A. The database device 800 in some embodiments can comprise the predictive pre-computes generator 159a/SQLE 159, the CPU's 147, or the local data processing resources 140 of FIG. 1C. The database device 800 in some embodiments can comprise the run time computational engine 710 or the pre-run time planning engine 750 of FIG. 7.

The memory 840 may comprise or include or a variety of computer-readable media, such as volatile memory, non-volatile memory, removable storage, and/or non-removable storage. The memory 840 can comprise one or more of random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Although the various data storage elements are illustrated as part of the database device 800, the storage may also or alternatively include cloud-based storage accessible via a network, such as the Internet or server based storage.

The interface 810 comprises communication components, such as ports, signal processing circuitry, memory, software, and the like. The interface 810 in some embodiments exchanges communications with other devices, systems, and/or networks. The interface 810 in some embodiments exchanges inputs and outputs with an operator. The interface 810 of the database device 800 may include an input interface, an output interface, and a communication interface. An output interface may include a display device, such as a touchscreen, that also may serve as an input device. An input interface may include one or more of a touchscreen, touchpad, mouse, keyboard, camera, one or more device-specific buttons, one or more sensors integrated within or coupled via wired or wireless data connections to the database device 800, and other input devices. The database device 800 may operate in a networked environment using the interface 810 to connect to one or more networks/communication links and/or to one or more remote computers, such as database servers or other devices or systems. The remote computer may include a personal computer (PC), server, router, network PC, a peer device or other common DFD network switch, or the like. The interface 810 may communicate over a Local Area Network (LAN), a Wide Area Network (WAN), cellular network, WiFi, Bluetooth, or other networks or systems.

Software routines/computer instructions, such as a graph generation routine 851 and a pre-join routine 853, are stored on a computer-readable medium and are executable by the processor 820. The computer-readable medium in some embodiments comprises the memory 840. The software comprises machine-readable instructions that control the operation of the processor 820 when executed by the processor 820. The software may also include operating systems, applications, utilities, databases, and the like. The software may be internally or externally stored. The term computer-readable medium does not include carrier waves or signals, to the extent carrier waves and signals are deemed too transitory.

The memory 840 stores routines and data, including one or more tables 850, a graph generation routine 851, one or more graphs 852, and a pre-join routine 853. The memory 840 can further store a predetermined join threshold 854, an edge weight or weights 855 of weighting values for edges in the one or more graphs 852, edge metadata 856 for edges in the one or more graphs 852, node metadata 857 for nodes in the one or more graphs 852, one or more graph community densities 858 corresponding to edges in the one or more graphs 852, and one or more filter routines 859.

The one or more tables 850 comprise tables to be processed as part of a database query processing. The one or more tables 850 can be received from other devices or storage systems of the queries processing system 10, for example.

The graph generation routine 851 processes the one or more tables 850 to generate the one or more graphs 852. Alternatively, the database device 800 can receive the one or more graphs 852 instead of receiving the one or more tables 850 and using the graph generation routine 851 to generate the one or more graphs 852.

The pre-join routine 853 processes the one or more graphs 852 to determine the set of pre-join operations to be performed (if any). The pre-join routine 853 in some embodiments also performs the identified pre-join operations, but alternatively other routines or devices can perform some or all of the identified pre-join operations.

The predetermined join threshold 854 in some embodiments is used to determine the set of pre-join operations to be performed. The join threshold 854 can be used to determine if potential join operations comprise pre-join operations to be performed. The join threshold 854 can include density values. The join threshold 854 can include table usage history values. The join threshold 854 can include table priority needs values. It is contemplated that other or additional values or information can be included in the join threshold 854 and are within the scope of the discussion and claims.

In some embodiments, the processor 820 executes the pre-join routine 853 and determines if a pre-join result will be larger than the join threshold 854. If the pre-join result will be larger than the join threshold 854, then the pre-join candidate is designated for partitioning.

The edge weight(s) 855 comprises a weighting value or values for corresponding graph edges represented within the one or more graphs 852. The edge weight(s) 855 are based on edge metadata for the corresponding graph edges. The edge weight(s) 855 can be used to determine the set of pre-join operations to be performed. A weighting value for an edge comprises a predetermined importance value in some embodiments.

The edge metadata 856 comprises metadata for edges of a graph or graphs represented within the one or more graphs 852. The edge metadata 856 comprises data for graph edges that can influence the pre-join processing. The edge metadata 856 in some embodiments identifies tables (nodes) joined by a particular edges. The edge metadata 856 in some embodiments includes one or more of a unique edge identification, an identification of a table operation type represented by the edge, or an identification of a represented set of join operations. The edge metadata 856 in some embodiments includes one or more of a join type, join dynamics, probability of the join being reference, geometry of the join, direction of the join, frequency of reference to the join results, historical trends in frequency of reference to the join results, or urgency priority for having the join results substantially immediately available.

The node metadata 857 comprises metadata for nodes of a graph or graphs represented within the one or more graphs 852. The node metadata 857 comprises data for graph nodes that can influence the pre-join processing. The node metadata 857 in some embodiments includes one or more of a unique node identification, an identification of a table represented by the node, an identification of a table type, an indication of a table size, an indication of maximal extents (length or distance) in different aspect dimensions of axes of a table, an indication of how persistent the table needs to be within memory, or an indication of a desired access speed for accessing the table.

The graph community density 858 comprises a density value or values for graph nodes in the one or more graphs 852. Each density value indicates a number of edges touching (or connected to) a particular node of a graph, wherein a density value for a graph node indicates how many join operations the graph node may be involved in. The graph community density 858 comprises a common density value or values for individual graph communities within the one or more graphs 852. Alternatively, the graph community density 858 comprises a common density range or ranges for individual graph communities within the one or more graphs 852. A graph that is represented within the one or more graphs 852 can be divided or segregated into nodes of common density values or common density ranges, wherein the division or segregation can be exploited for determining the set of pre join operations to be performed.

The one or more filter routines 859 comprise filters that filter out join types (or other query operation types) when applied to the one or more graphs 852. The one or more filter routines 859 can alternatively (or in addition) filter out non-join operation types in the one or more graphs 852. The one or more filter routines 859 can be used to reduce the number of query operation types, including reducing the number of query operation types to the most important or useful query operation types. The one or more filter routines 859 can be used to reduce the number of join operations or join operation types. The one or more filter routines 859 can be used to reduce the number of join operations or join operation types using table usage history information and/or table priority needs information in some embodiments.

In some embodiments, one or more processors 820 of the database device 800 execute the instructions in the memory 840 to create a graph 852 of weighted edges and nodes, where the nodes represent relational tables and the edges represent join operations that are to be performed on the tables, partition the graph 852 into a plurality of graph communities based on corresponding graph community densities 858, with a density of the graph community densities 858 indicating a number of edges touching a particular node, with the number of edges being greater than a predetermined edge number threshold, with each edge further including an edge weight 855 indicative of a frequency of referencing within a predetermined recent duration of time and/or indicative of urgency of quick access to the corresponding join result within a predetermined recent duration of time, and generate pre-join results based on the partitioned graph communities and graph community densities 858.

In some embodiments, the one or more processors 820 further execute the instructions in the memory 840 to order the detected graph communities according to the graph community densities 858, where the graph community densities 858 are indicative of collective frequency of referencing to members of the graph community and/or indicative of collective urgency of access to the members of the graph community, and identify a densest node within one of the ordered graph communities.

In some embodiments, the one or more processors 820 further execute the instructions in the memory 840 to order the detected graph communities according to the graph community densities 858, where the graph community densities 858 are indicative of collective frequency of referencing to members of the graph community and/or indicative of collective urgency of access to the members of the graph community, identify a densest node within one of the ordered graph communities, and generate the pre-join results by sequencing from a first ordered graph community to a next ordered graph community based on the ordering.

In some embodiments, the generating of the pre-join results further comprises determining if a pre-join result will be larger than a predetermined table size threshold, and if the pre-join result will be larger than the predetermined table size threshold, designating a corresponding pre-join candidate for partitioning.

Computer-readable non-transitory media described herein may include all types of non-transitory computer readable media, including magnetic storage media, optical storage media, and solid state storage media and specifically excludes transitory signals and mere wires, cables or mere optical fibers that carry them. It should be understood that the software can be installed in and sold with the pre-compute and/or pre-load planning subsystem. Alternatively the software can be obtained and loaded into the pre-compute and/or pre-load planning subsystem, including obtaining the software via a disc medium or from any manner of network or distribution system, including, for example, from a server owned by the software creator or from a server not owned but used by the software creator. The software can be stored on a server for distribution over the Internet, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for identifying a set of pre join operations to be performed, when accessing a database of relational tables, based on a table usage history and/or apriority needs, the method comprising:
   creating a graph of weighted edges and nodes, the nodes representing relational tables and the edges representing join operations to be performed on the tables, the nodes being associated with node metadata, the node metadata indicating at least one of a unique node identification, an identification of a table represented by the node, an identification of a table type, an indication of a table size, an indication of maximal extents in different aspect dimensions of axes of the table, an indication of how persistent the table needs to be within memory, or an indication of a desired access speed for accessing the table;
   partitioning the graph into a plurality of graph communities based on corresponding graph community densities, with a density of the graph community densities indicating a number of edges touching a particular node, with the number of edges being greater than a predetermined edge number threshold, with each edge further including an edge weight indicative of a frequency of referencing within a predetermined recent duration of time and/or indicative of urgency of quick access to the corresponding join result within a predetermined recent duration of time; and
   generating pre join results based on the partitioned graph communities and graph community densities.

2. The method of claim 1, wherein edge weights are based on edge metadata associated with the edges, the edge metadata indicating at least one of a join type, join dynamics, probability of the join being referenced, geometry of the join, direction of the join, frequency of reference to the join results, historical trends in frequency of reference to the join results, or urgency priority for having the join results substantially immediately available.

3. The method of claim 2, wherein the edge metadata provides a unique identification for the corresponding edge and/or a represented set of join operations.

4. The method of claim 2, wherein the edge metadata identify tables joined by the respective edge.

5. The method of claim 2, wherein the graph is filtered to leave a specific one or more of different join types before performing the graph community detection process.

6. The method of claim 1, wherein the generating of the pre-join results comprises:
   ordering detected graph communities according to graph community densities, where the graph community densities are indicative of collective frequency of referencing to members of the graph community and/or indicative of collective urgency of access to the members of the graph community; and
   identifying a densest node within one of the ordered graph communities.

7. The method of claim 6, wherein the generating of the pre-join results further comprises sequencing from a first ordered graph community to a next ordered graph community based on said ordering.

8. The method of claim 6, wherein the generating of the pre-join results further comprises determining if a pre join result will be larger than a predetermined table size threshold, and if the pre-join result will be larger than the predetermined table size threshold, designating a corresponding pre join candidate for partitioning.

9. A database device, comprising:
   a memory storage comprising instructions; and
   one or more processors in communication with the memory, wherein the one or more processors execute the instructions to:
      create a graph of weighted edges and nodes, the nodes representing relational tables and the edges representing join operations to be performed on the tables, the nodes being associated with node metadata, the node metadata indicating at least one of a unique node identification, an identification of a table represented by the node, an identification of a table type, an indication of a table size, an indication of maximal extents in different aspect dimensions of axes of the table, an indication of how persistent the table needs to be within memory, or an indication of a desired access speed for accessing the table;

partition the graph into a plurality of graph communities based on corresponding graph community densities, with a density of the graph community densities indicating a number of edges touching a particular node, with the number of edges being greater than a predetermined edge number threshold, with each edge further including an edge weight indicative of a frequency of referencing within a predetermined recent duration of time and/or indicative of urgency of quick access to the corresponding join result within a predetermined recent duration of time; and generate pre-join results based on the partitioned graph communities and graph community densities.

10. The database device of claim 9, wherein edge weights are based on edge metadata associated with the edges, the edge metadata indicating at least one of a join type, join dynamics, probability of the join being referenced, geometry of the join, direction of the join, frequency of reference to the join results, historical trends in frequency of reference to the join results, or urgency priority for having the join results substantially immediately available.

11. The database device of claim 10, wherein the edge metadata provides a unique identification for the corresponding edge and/or a represented set of join operations.

12. The database device of claim 10, wherein the edge metadata identify tables joined by the respective edge.

13. The database device of claim 10, wherein the graph is filtered to leave a specific one or more predetermined join types before performing the graph community detection process.

14. The database device of claim 9, wherein the generating of the pre-join results comprises:

ordering detected graph communities according to graph community densities, where the graph community densities are indicative of collective frequency of referencing to members of the graph community and/or indicative of collective urgency of access to the members of the graph community; and identifying a densest node within one of the ordered graph communities.

15. The database device of claim 14, wherein the generating of the pre-join results further comprises sequencing from a first ordered graph community to a next ordered graph community based on said ordering.

16. The database device of claim 14, wherein the generating of the pre-join results further comprises determining if a pre-join result will be larger than a predetermined table size threshold, and if the pre-join result will be larger than the predetermined table size threshold, designating a corresponding pre-join candidate for partitioning.

* * * * *